US011835947B1

(12) United States Patent
Siegel et al.

(10) Patent No.: US 11,835,947 B1
(45) Date of Patent: Dec. 5, 2023

(54) ITEM EXCHANGE BETWEEN AUTONOMOUS VEHICLES OF DIFFERENT SERVICES

(71) Applicant: Amazon Technologies, Inc., Seattle, WA (US)

(72) Inventors: Hilliard Bruce Siegel, Seattle, WA (US); Ethan Zane Evans, Sumner, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/839,018

(22) Filed: Jun. 13, 2022

Related U.S. Application Data

(63) Continuation of application No. 16/724,851, filed on Dec. 23, 2019, now Pat. No. 11,402,837, which is a
(Continued)

(51) Int. Cl.
*G05D 1/00* (2006.01)
*G05D 1/02* (2020.01)
(Continued)

(52) U.S. Cl.
CPC ......... *G05D 1/0027* (2013.01); *G01C 21/343* (2013.01); *G01C 23/00* (2013.01); *G05D 1/0225* (2013.01); *G05D 1/0808* (2013.01); *G05D 1/101* (2013.01); *G06Q 10/08355* (2013.01); *G05D 2201/0207* (2013.01)

(58) Field of Classification Search
None
See application file for complete search history.

(56) References Cited

U.S. PATENT DOCUMENTS 4,865,248 A 9/1989 Barth
4,954,962 A 9/1990 Evans, Jr. et al.
(Continued)

FOREIGN PATENT DOCUMENTS

EP 151896610 10/2015
EP 151926482 11/2015
(Continued)

OTHER PUBLICATIONS

Arbanas et al, "Aerial-ground Robotic System for Autonomous Delivery Tasks", May 16-21, 2016, IEEE (Year: 2016).*
(Continued)

*Primary Examiner* — Hussein Elchanti
*Assistant Examiner* — Kenneth M Dunne
(74) *Attorney, Agent, or Firm* — Athorus, PLLC

(57) ABSTRACT

The present disclosure is directed toward the use of two or more autonomous vehicles, working in cooperation, to deliver an item between a source location and a destination location. For example, an autonomous ground based vehicle may transport an item from a source location to a transfer location and an autonomous aerial vehicle will transport the item from the transfer location to the destination location. The transfer location may be at any location along a navigation path between the source location and the destination location. In some examples, the transfer location may be adjacent the destination location such that the autonomous aerial vehicle is only transporting the item a short distance.

15 Claims, 15 Drawing Sheets

Related U.S. Application Data continuation of application No. 15/352,423, filed on Nov. 15, 2016, now Pat. No. 10,514,690.

(51) Int. Cl.
*G05D 1/08* (2006.01)
*G01C 21/34* (2006.01)
*G06Q 10/0835* (2023.01)
*G05D 1/10* (2006.01)
*G01C 23/00* (2006.01)

(56) References Cited

U.S. PATENT DOCUMENTS

| | | | |
|---|---|---|---|
| 5,040,116 | A | 8/1991 | Evans, Jr. et al. |
| 5,386,462 | A | 1/1995 | Schlamp |
| 5,995,898 | A | 11/1999 | Tuttle |
| 6,344,796 | B1 | 2/2002 | Ogilvie et al. |
| 6,426,699 | B1 | 7/2002 | Porter |
| 6,690,997 | B2 | 2/2004 | Rivalto |
| 6,694,217 | B2 | 2/2004 | Bloom |
| 6,919,803 | B2 | 7/2005 | Breed |
| 6,961,711 | B1 | 11/2005 | Chee |
| 6,970,838 | B1 | 11/2005 | Kamath et al. |
| 6,974,077 | B1 | 12/2005 | Beyder et al. |
| 7,129,817 | B2 | 10/2006 | Yamagishi |
| 7,133,743 | B2 | 11/2006 | Tilles et al. |
| 7,149,611 | B2 | 12/2006 | Beck et al. |
| 7,188,513 | B2 | 3/2007 | Wilson |
| 7,337,686 | B2 | 3/2008 | Sagi-Dolev |
| 7,337,944 | B2 | 3/2008 | Devar |
| 7,339,993 | B1 | 3/2008 | Brooks et al. |
| 7,946,530 | B1 | 5/2011 | Talmage, Jr. |
| 8,370,003 | B2* | 2/2013 | So ............ B64D 1/22 701/3 |
| 8,418,959 | B2 | 4/2013 | Kang et al. |
| 8,511,606 | B1 | 8/2013 | Utke et al. |
| 8,602,349 | B2 | 12/2013 | Petrov |
| 8,736,820 | B2 | 5/2014 | Choe et al. |
| 8,899,903 | B1 | 12/2014 | Saad et al. |
| 8,956,100 | B2 | 2/2015 | Davi et al. |
| 8,989,053 | B1 | 3/2015 | Skaaksrud et al. |
| 9,033,285 | B2 | 5/2015 | Iden et al. |
| 9,073,624 | B2* | 7/2015 | Jones ............ B64C 39/024 |
| 9,079,587 | B1 | 7/2015 | Rupp et al. |
| 9,079,662 | B1* | 7/2015 | Duffy ............ B64C 37/02 |
| 9,139,310 | B1 | 9/2015 | Wang |
| 9,205,922 | B1* | 12/2015 | Bouwer ............ G05D 1/0858 |
| 9,216,587 | B2 | 12/2015 | Ando et al. |
| 9,216,857 | B1 | 12/2015 | Kalyan et al. |
| 9,235,213 | B2 | 1/2016 | Villamar |
| 9,244,147 | B1 | 1/2016 | Soundararajan et al. |
| 9,256,852 | B1 | 2/2016 | Myllymaki |
| 9,336,506 | B2 | 5/2016 | Shucker et al. |
| 9,381,916 | B1 | 7/2016 | Zhu et al. |
| 9,409,644 | B2 | 8/2016 | Stanek et al. |
| 9,412,280 | B1 | 8/2016 | Zwillinger et al. |
| 9,535,421 | B1 | 1/2017 | Canoso et al. |
| 9,545,852 | B2 | 1/2017 | Streett |
| 9,650,136 | B1 | 5/2017 | Haskin et al. |
| 9,656,805 | B1 | 5/2017 | Evans et al. |
| 9,671,791 | B1 | 6/2017 | Paczan |
| 9,718,564 | B1 | 8/2017 | Beckman et al. |
| 9,731,821 | B2 | 8/2017 | Hoareau et al. |
| 9,778,653 | B1 | 10/2017 | McClintock et al. |
| 9,796,529 | B1 | 10/2017 | Hoareau et al. |
| 9,824,324 | B2 | 11/2017 | Trew et al. |
| 9,828,092 | B1 | 11/2017 | Navot et al. |
| 10,248,120 | B1 | 4/2019 | Siegel et al. |
| 2001/0045449 | A1 | 11/2001 | Shannon |
| 2001/0052842 | A1 | 12/2001 | Asama et al. |
| 2002/0016726 | A1 | 2/2002 | Ross |
| 2002/0087375 | A1 | 7/2002 | Griffin et al. |
| 2002/0111914 | A1 | 8/2002 | Terada et al. |
| 2002/0116289 | A1 | 8/2002 | Yang |
| 2002/0123930 | A1 | 9/2002 | Boyd et al. |
| 2003/0040980 | A1 | 2/2003 | Nakajima et al. |
| 2003/0141411 | A1 | 7/2003 | Pandya et al. |
| 2006/0053534 | A1 | 3/2006 | Mullen |
| 2006/0136237 | A1 | 6/2006 | Spiegel et al. |
| 2006/0241521 | A1 | 10/2006 | Cohen |
| 2007/0016496 | A1 | 1/2007 | Bar et al. |
| 2007/0073552 | A1 | 3/2007 | Hileman |
| 2007/0150375 | A1 | 6/2007 | Yang |
| 2007/0170237 | A1 | 7/2007 | Neff |
| 2007/0293978 | A1 | 12/2007 | Wurman et al. |
| 2008/0109246 | A1 | 5/2008 | Russell |
| 2008/0150679 | A1 | 6/2008 | Bloomfield |
| 2008/0154659 | A1 | 6/2008 | Bettes et al. |
| 2008/0167817 | A1 | 7/2008 | Hessler et al. |
| 2008/0301009 | A1 | 12/2008 | Plaster et al. |
| 2009/0062974 | A1 | 3/2009 | Tamamoto et al. |
| 2009/0063166 | A1 | 3/2009 | Palmer |
| 2009/0106124 | A1 | 4/2009 | Yang |
| 2009/0149985 | A1 | 6/2009 | Chirnomas |
| 2009/0198374 | A1 | 8/2009 | Tsai et al. |
| 2009/0236470 | A1 | 9/2009 | Goossen et al. |
| 2009/0299903 | A1 | 12/2009 | Hung et al. |
| 2009/0314883 | A1 | 12/2009 | Arlton et al. |
| 2010/0193626 | A1 | 8/2010 | Goossen et al. |
| 2011/0035149 | A1 | 2/2011 | McAndrew et al. |
| 2011/0166707 | A1 | 7/2011 | Romanov et al. |
| 2011/0264311 | A1 | 10/2011 | Lee et al. |
| 2012/0039694 | A1 | 2/2012 | Suzanne |
| 2012/0109419 | A1 | 5/2012 | Mercado |
| 2012/0219397 | A1 | 8/2012 | Baker |
| 2013/0073477 | A1 | 3/2013 | Grinberg |
| 2013/0081245 | A1 | 4/2013 | Vavrina et al. |
| 2013/0148123 | A1 | 6/2013 | Hayashi |
| 2013/0218799 | A1 | 8/2013 | Ehmann et al. |
| 2013/0261792 | A1 | 10/2013 | Gupta et al. |
| 2013/0262251 | A1 | 10/2013 | Wan et al. |
| 2013/0262252 | A1 | 10/2013 | Lakshman et al. |
| 2013/0262276 | A1 | 10/2013 | Wan et al. |
| 2013/0262336 | A1 | 10/2013 | Wan et al. |
| 2013/0264381 | A1 | 10/2013 | Kim et al. |
| 2013/0268118 | A1 | 10/2013 | Grinstead et al. |
| 2014/0022055 | A1 | 1/2014 | Levien et al. |
| 2014/0025230 | A1 | 1/2014 | Levien et al. |
| 2014/0030444 | A1 | 1/2014 | Swaminathan et al. |
| 2014/0032034 | A1 | 1/2014 | Raptopoulos et al. |
| 2014/0052661 | A1 | 2/2014 | Shakes et al. |
| 2014/0081445 | A1 | 3/2014 | Villamar |
| 2014/0136282 | A1 | 5/2014 | Fedele |
| 2014/0136414 | A1 | 5/2014 | Abhyanker |
| 2014/0180914 | A1 | 6/2014 | Abhyanker |
| 2014/0254896 | A1 | 9/2014 | Zhou et al. |
| 2014/0330456 | A1 | 11/2014 | Morales et al. |
| 2015/0006005 | A1 | 1/2015 | Yu et al. |
| 2015/0069968 | A1 | 3/2015 | Pounds |
| 2015/0083888 | A1* | 3/2015 | Krawchuk ............ E21B 15/00 248/678 |
| 2015/0102154 | A1 | 4/2015 | Duncan et al. |
| 2015/0120094 | A1 | 4/2015 | Kimchi et al. |
| 2015/0120602 | A1 | 4/2015 | Huffman et al. |
| 2015/0129716 | A1 | 5/2015 | Yoffe |
| 2015/0153175 | A1 | 6/2015 | Skaaksrud |
| 2015/0158599 | A1 | 6/2015 | Sisko |
| 2015/0175276 | A1 | 6/2015 | Koster |
| 2015/0183528 | A1 | 7/2015 | Walsh et al. |
| 2015/0185034 | A1 | 7/2015 | Abhyanker |
| 2015/0202770 | A1 | 7/2015 | Patron et al. |
| 2015/0227882 | A1 | 8/2015 | Bhatt |
| 2015/0246727 | A1 | 9/2015 | Masticola et al. |
| 2015/0259078 | A1 | 9/2015 | Filipovic et al. |
| 2015/0317597 | A1 | 11/2015 | Shucker et al. |
| 2015/0332206 | A1 | 11/2015 | Trew et al. |
| 2015/0367850 | A1 | 12/2015 | Clarke et al. |
| 2015/0370251 | A1 | 12/2015 | Siegel et al. |
| 2016/0009413 | A1 | 1/2016 | Lee et al. |
| 2016/0033966 | A1 | 2/2016 | Farris et al. |
| 2016/0104099 | A1 | 4/2016 | Villamar |
| 2016/0107750 | A1 | 4/2016 | Yates |
| 2016/0114488 | A1 | 4/2016 | Medina et al. |

(56) References Cited

U.S. PATENT DOCUMENTS

| | | |
|---|---|---|
| 2016/0117931 A1 | 4/2016 | Chan et al. |
| 2016/0144734 A1 | 5/2016 | Wang et al. |
| 2016/0144982 A1 | 5/2016 | Sugumaran |
| 2016/0196755 A1 | 7/2016 | Navot et al. |
| 2016/0196756 A1 | 7/2016 | Prakash et al. |
| 2016/0200438 A1 | 7/2016 | Bokeno et al. |
| 2016/0203649 A1 | 7/2016 | Berkobin et al. |
| 2016/0207627 A1 | 7/2016 | Hoareau et al. |
| 2016/0235236 A1 | 8/2016 | Byers et al. |
| 2016/0239803 A1 | 8/2016 | Borley et al. |
| 2016/0257401 A1 | 9/2016 | Buchmueller et al. |
| 2016/0266578 A1 | 9/2016 | Douglas et al. |
| 2016/0299233 A1 | 10/2016 | Levien et al. |
| 2016/0334229 A1 | 11/2016 | Ross et al. |
| 2016/0345832 A1 | 12/2016 | Nagaraja et al. |
| 2016/0364989 A1 | 12/2016 | Speasl et al. |
| 2016/0366372 A1 | 12/2016 | Kuroda |
| 2017/0011333 A1 | 1/2017 | Greiner et al. |
| 2017/0011340 A1 | 1/2017 | Gabbai |
| 2017/0023947 A1 | 1/2017 | Mcmillion |
| 2017/0032315 A1 | 2/2017 | Gupta et al. |
| 2017/0096222 A1 | 4/2017 | Spinelli et al. |
| 2017/0098191 A1 | 4/2017 | Lee et al. |
| 2017/0098378 A1 | 4/2017 | Soundararajan et al. |
| 2017/0101017 A1 | 4/2017 | Streett |
| 2017/0147975 A1 | 5/2017 | Natarajan et al. |
| 2017/0164319 A1 | 6/2017 | Skaaksrud et al. |
| 2017/0167881 A1 | 6/2017 | Rander et al. |
| 2017/0255896 A1 | 9/2017 | Dyke |
| 2017/0286892 A1 | 10/2017 | Studnicka |
| 2017/0300855 A1 | 10/2017 | Lund et al. |
| 2017/0316379 A1 | 11/2017 | Lepek et al. |
| 2018/0075759 A1 | 3/2018 | Kim et al. |
| 2018/0232839 A1 | 8/2018 | Heinla et al. |
| 2019/0049988 A1 | 2/2019 | Meij |
| 2019/0220819 A1 | 7/2019 | Banvait et al. |

FOREIGN PATENT DOCUMENTS

| | | |
|---|---|---|
| EP | 151926490 | 11/2015 |
| EP | 151980943 | 12/2015 |
| EP | 161751359 | 6/2016 |
| EP | 161869078 | 9/2016 |
| EP | 161953724 | 10/2016 |
| EP | 162041537 | 12/2016 |
| WO | 2016025047 | 1/2017 |
| WO | 2017076806 A1 | 5/2017 |
| WO | 2017076813 A1 | 5/2017 |
| WO | 2017076928 A1 | 5/2017 |
| WO | 2018024847 A1 | 2/2018 |
| WO | 2018024851 A1 | 2/2018 |
| WO | 2018024852 A1 | 2/2018 |

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

http://qz.com/613277/google-wants-to-deliver-packages-from-self-driving-trucks/.

https://www.starship.xyz/.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

* cited by examiner

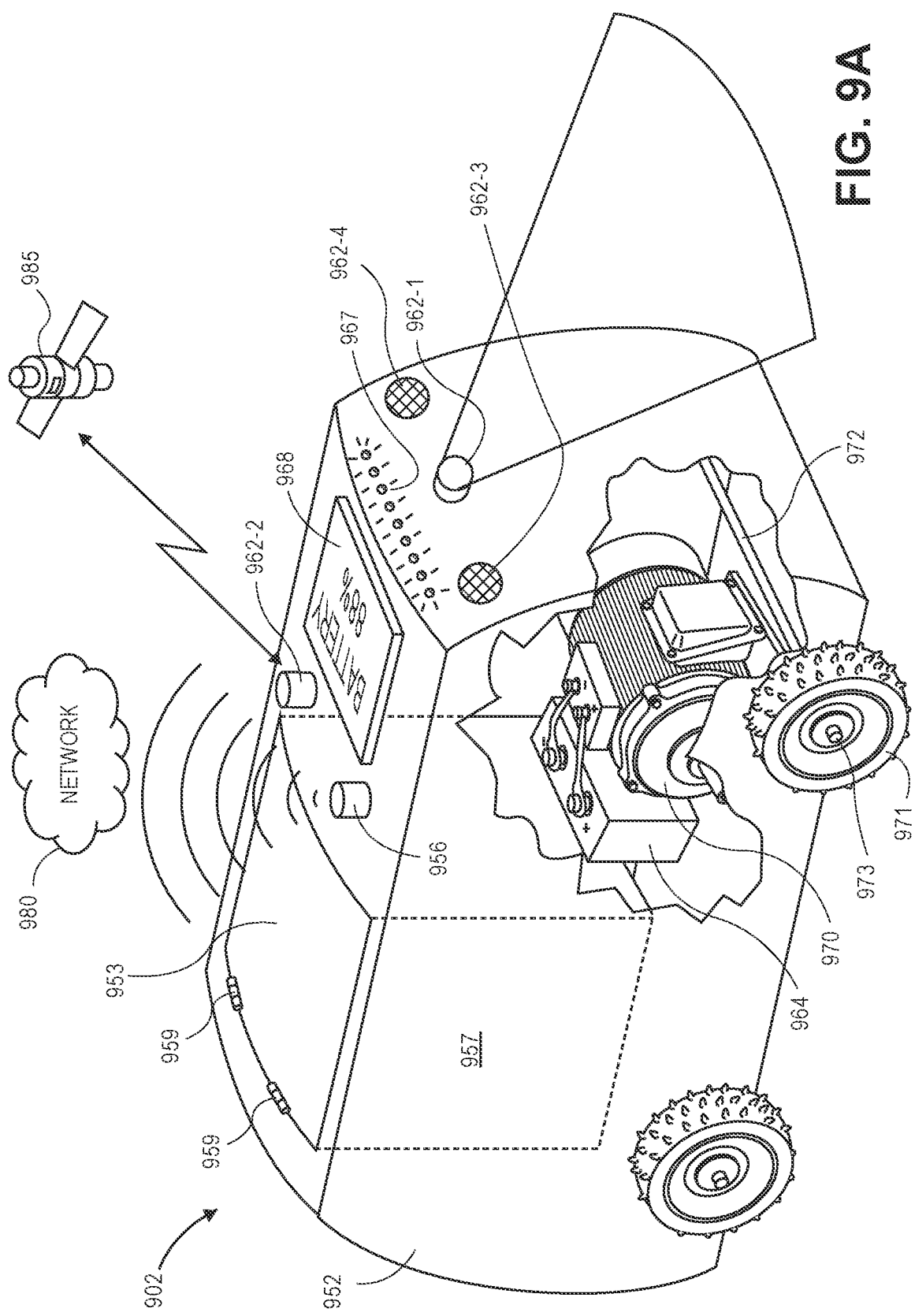

ITEM EXCHANGE BETWEEN AUTONOMOUS VEHICLES OF DIFFERENT SERVICES

PRIORITY CLAIM

This application is a continuation of U.S. patent application Ser. No. 16/724,851, filed Dec. 23, 2019, which is a continuation of U.S. patent application Ser. No. 15/352,423, filed Nov. 15, 2016, now U.S. Pat. No. 10,514,690, the contents of each of which are herein incorporated by reference in their entirety.

BACKGROUND

Many companies, including "big box" retail and mail-order companies, package items (e.g., books, CDs, apparel, food, etc.) and/or groups of items together to be shipped in fulfillment of requests from customers (e.g., internal or external, retail or wholesale customers). Retailers, wholesalers, and other product distributors (which may collectively be referred to as distributors) typically maintain an inventory of various items that may be ordered by customers. This inventory may be maintained and processed at a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. The delivery of physical items to a customer's specified location is traditionally accomplished using a delivery system including a human controlled truck, bicycle, cart, etc. For example, a customer may order an item for delivery to their home. The item may be picked by a human agent from a materials handling facility, packed and shipped to the customer for final delivery by a shipping carrier, such as the United States Postal Service, FedEx, or UPS. An agent of the shipping carrier will load the item onto a truck that is driven to the final destination location and a driver, or another human companion with the driver, will retrieve the item from the truck and complete the delivery to the destination. Over time, an increasing frequency and volume of deliveries of items from e-commerce and mail-order companies has resulted in an increased need for faster and more efficient delivery methods.

BRIEF DESCRIPTION OF THE DRAWINGS

FIG. 9A-9C are views of autonomous ground vehicles, in accordance with implementations of the present disclosure.

DETAILED DESCRIPTION

As is set forth in greater detail below, the present disclosure is directed toward the use of two or more autonomous vehicles, working in cooperation, to deliver an item between a source location and a destination location. For example, an autonomous ground based vehicle may transport an item from a source location to a transfer location and an autonomous aerial vehicle will transport the item from the transfer location to the destination location. The transfer location may be any location along a navigation path between the source location and the destination location. In some examples, the transfer location may be adjacent the destination location such that the autonomous aerial vehicle is only transporting the item a short distance. This may be done so that autonomous delivery of the item can overcome different obstacles. For example, if the item is to be delivered to a front doorstep of a home residence that is behind a privacy fence, up a flight of stairs, etc., that would obstruct delivery by the autonomous ground based vehicle, the autonomous ground based vehicle may transport the item from a source location to a transfer location that is just prior to the obstacle. The item may then be autonomously transferred from the autonomous ground based vehicle to an autonomous aerial vehicle and the autonomous aerial vehicle may aerially transport the item over the obstacle and complete delivery of the item to the destination location. As will be appreciated, there may be any number and variety of obstacles that would obstruct passage by one type of autonomous vehicle but not another. As such, any combination of autonomous vehicles may be utilized to complete a transport of an item from a source location to a destination location.

In some examples, in addition to or as an alternative to transferring the item from one autonomous vehicle to another, two or more autonomous vehicles may communicate to assist one another in item transport. For example, an autonomous ground based vehicle may wirelessly communicate with an autonomous aerial vehicle to receive assistance in navigation path planning. In other examples, an autonomous aerial vehicle may aerially transport an autonomous ground based vehicle and the item from one location to another along a delivery path.

A few examples of autonomous vehicle cooperation for item delivery between a source location and a destination location are discussed with respect to FIGS. 1-7. However, it will be appreciated that those discussed are only examples and many other combinations or types of cooperative autonomous vehicle item delivery may be realized with the disclosed implementations.

Figure 1:
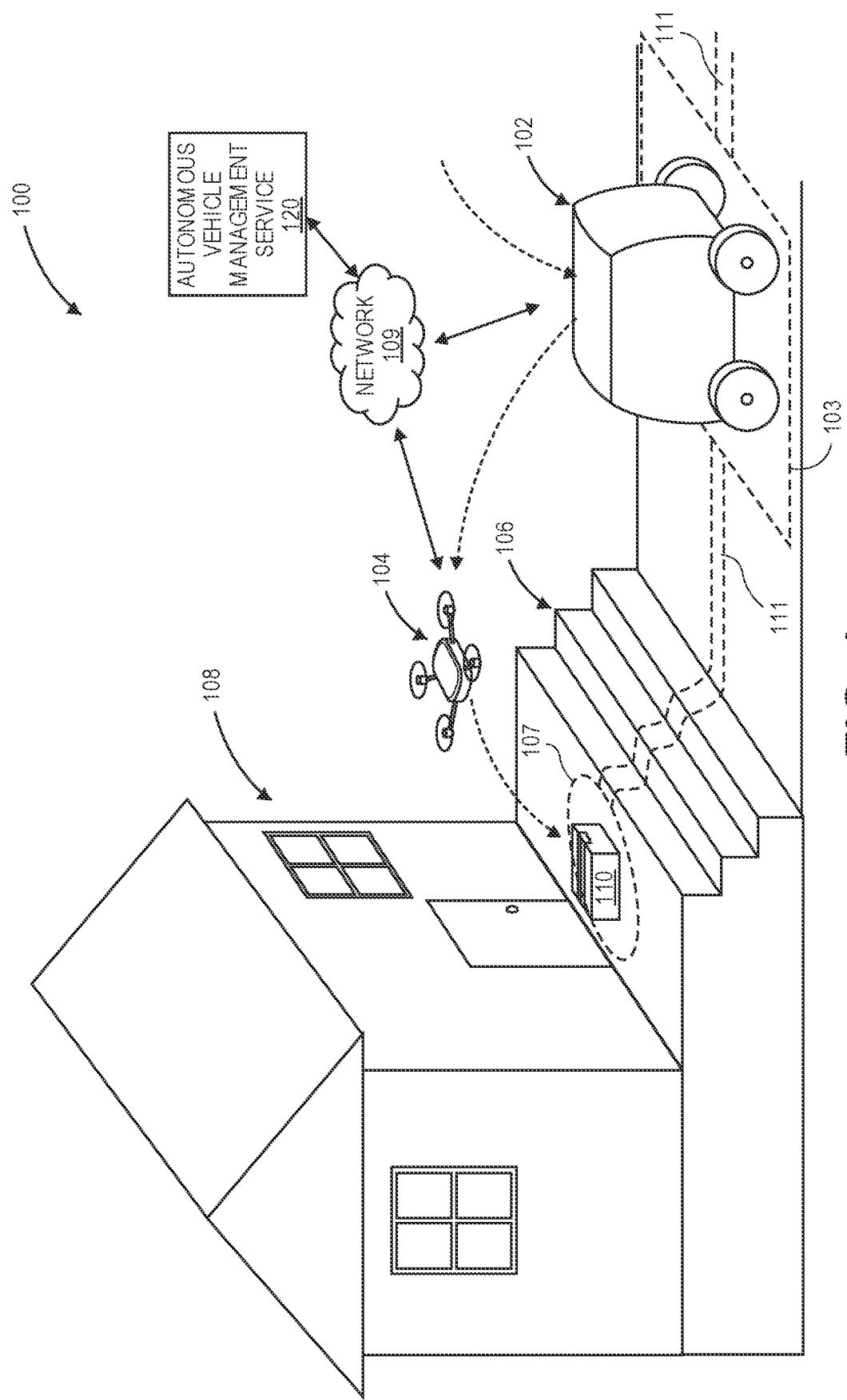
FIGS. 1-7 illustrate various environments and item delivery within those environments through cooperation of at least two autonomous vehicles, in accordance with implementations of the present disclosure.

Referring first to FIG. 1, illustrated is an environment 100 in which an autonomous ground based vehicle 102 transports an item 110 from a source location along a navigation path 111 to a transfer location 103 that is adjacent a destination location 107, in accordance with disclosed implementations. An item may be any item that is capable of being transported by autonomous vehicles. For example, the item may be an item ordered by a customer via an electronic commerce website and the customer may specify that the item is to be delivered to a destination location, such as the personal residence 108, a business office, etc. In this example, the destination location 107 is on a front doorstep of a personal residence 108.

As part of the item delivery, an autonomous vehicle management service 120 may receive the order for the item 110, determine a source location of the item 110 (e.g., a fulfillment center associated with the e-commerce marketplace that maintains the item in inventory), a destination location 107 (which may be specified by the customer), a navigation path 111 between the source location and the destination location 107, and two or more autonomous vehicles, such as the autonomous ground based vehicle 102 and the autonomous aerial vehicle 104, that will cooperate to transport the item 110 from the source location to the destination location 107 along the navigation path 111. Likewise, the autonomous vehicle management service 120 may determine one or more obstacles 106 along the navigation path and plan one or more transfer locations 103 for transfer of the item 110 between a first autonomous vehicle, such as the autonomous ground based vehicle 102, and a second autonomous vehicle, such as the autonomous aerial vehicle 104, so that the second autonomous vehicle can transport the item 110 past the obstacle and continue along the navigation path.

In the example illustrated in FIG. 1, the transfer location 103 is specified to be adjacent the determined obstacle 106 so that the autonomous aerial vehicle 104 only has to transport the item 110 for a short distance between the transfer location 103 and the destination location 107. Transport of an item by an autonomous aerial vehicle 104 a short distance may be beneficial, for example, to limit the amount of power consumed by the autonomous aerial vehicle 104 in transporting the item, limit the noise produced by aerial transport of the item, etc.

Upon determination of the navigation path 111 and the autonomous vehicle that is to transport the item from the source location along the navigation path, the autonomous vehicle management service 120 may send instructions to the determined autonomous vehicle, in this example the autonomous ground based vehicle 102, to navigate to the source location, retrieve the item, and initiate transport of the item along a navigation path 111. The instructions may be sent by the autonomous vehicle management service 120 via a network 109, such as the Internet, using wireless and/or wired communication.

As the autonomous vehicle 102 transports the item along the navigation path and toward the transfer location, the autonomous vehicle management service 120 may determine a second autonomous vehicle that is available and capable of transporting the item from the transfer location and past the obstacle 106. As discussed further below, a second autonomous vehicle may be determined to be available if the second autonomous vehicle is or will be within a defined distance of the transfer location 103 at an approximate time that the first autonomous vehicle 102 will arrive at the transfer location 103 with the item 110, and the second autonomous vehicle not scheduled to perform another task or operation. Likewise, the second autonomous vehicle may be determined to be capable if the second autonomous vehicle has sufficient payload capabilities to transport the item, has sufficient power to transport the item, and is able to autonomously retrieve the item from the first autonomous vehicle and transport the item along the navigation path and past the obstacle. For example, if the obstacle includes stairs, a fence, a curb, a body of water, traffic, weather, congestion, a vertical distance, or other obstacle that cannot be navigated by a ground based vehicle, an autonomous ground based vehicle will not be determined as capable. In comparison, an autonomous aerial vehicle that has the capacity to aerially transport the item past the obstacle will be determined to be a capable autonomous vehicle.

In the example illustrated in FIG. 1, it is determined that the autonomous aerial vehicle 104 is available and capable of retrieving the item from the autonomous ground based vehicle 102 while the autonomous ground based vehicle 102 is at the transfer location 103. In such an example, the autonomous aerial vehicle 104 will navigate to the transfer location 103, retrieve the item, aerially transport the item past the obstacle 106, and complete delivery of the item 110 to the destination location 107. While the example illustrated in FIG. 1 only illustrates a single transfer location and a single transfer of the item between an autonomous ground based vehicle 102 and an autonomous aerial vehicle 104, in other instances there may be multiple transfer locations along a navigation path between a source location and a destination location and the item may be transferred between the same or different types of autonomous vehicles at each transfer location as part of the transport of the item between the source location and the destination location.

The autonomous vehicles, such as the autonomous ground based vehicle 102 and/or the autonomous aerial vehicle 104 may be part of a network of autonomous vehicles that are configured to transport items between locations and/or perform other tasks. The network of autonomous vehicles may communicate over the network 109 and receive instructions from the autonomous vehicle management service 120 instructing each autonomous vehicle to perform one or more tasks (e.g., navigate along a navigation path) or operation. In some implementations, the autonomous vehicles may communicate directly with other autonomous vehicles via the network 109 and/or via direct communication (e.g., in the form of a peer-to-peer network).

Figure 2:
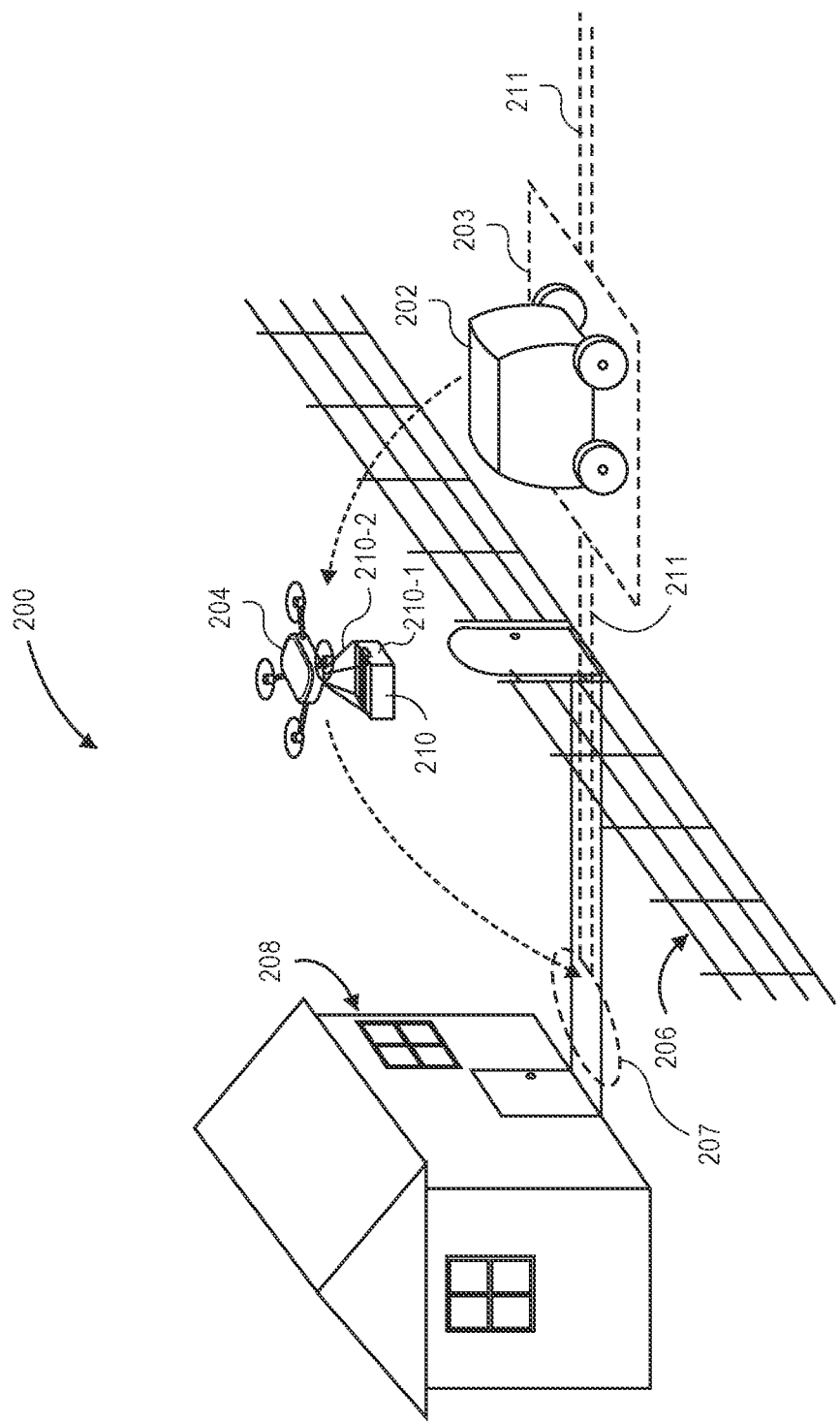

FIG. 2 illustrates another environment 200 in which an item 210 is being transported along a navigation path between a source location and a destination location 207 using two or more autonomous vehicles, in accordance with described implementations. Except where otherwise noted, reference numerals preceded by the number "2" in FIG. 2 refer to elements that are similar to elements having reference numerals preceded by the number "1" shown in FIG. 1.

Similar to FIG. 1, an autonomous ground based vehicle 202 transports the item 210 along a navigation path 211 to a determined transfer location 203, an autonomous aerial vehicle 204 retrieves the item 210 from the autonomous ground based vehicle 202 at the transfer location 203, aerially transports the item past an obstacle 206, in this example a fence, and to a destination location 207. In this example the destination location 207 is adjacent a personal residence 208. As illustrated and as discussed further below with respect to FIGS. 9C and 10, the autonomous ground vehicle 202 may utilize different mechanisms for transporting the item along the navigation path and the autonomous aerial vehicle 204 may utilize different mechanisms to retrieve the item 210 from the autonomous vehicle 204 and aerially transport the item 210. In the example illustrated in FIG. 2, the autonomous ground vehicle 202 may carry the item in a container or on a platform that is positioned atop the autonomous ground vehicle 202 such that the item is easily accessible by the autonomous aerial vehicle 204. In other implementations, other mechanisms may be utilized.

Similarly, the autonomous aerial vehicle 204 includes an inventory engagement mechanism that is used to engage the item 210, aerially transport the item 210, and deliver the item 210 at the destination location by releasing the item from the inventory engagement mechanism. For example, as illustrated, the item 210 may be stored in a container 210-1 that includes flexible members 210-2, such as cables, ropes, string, etc., coupled to the corners or other locations on the container 210-1. The inventory engagement mechanism of the aerial vehicle 204 may be configured to engage the flexible members 210-2 so that the autonomous vehicle can transport the item.

Likewise, in comparison to FIG. 1, the autonomous vehicles illustrated in FIG. 2 may communicate directly to coordinate transport of the item. For example, the autonomous ground based vehicle 202 may navigate the navigation path 211 toward the source location until it reaches or detects the obstacle 206. Upon reaching or detecting the obstacle 206, the autonomous ground based vehicle may determine a transfer location 203 and wirelessly communicate with the autonomous aerial vehicle 204 to request that the autonomous aerial vehicle navigate to the transfer location, retrieve the item, and complete delivery of the item to the destination location. For example, a plurality of aerial vehicles may be within a defined distance of the determined transfer location and the autonomous ground based vehicle may send a request to one or more of those autonomous aerial vehicles indicating the transfer location, an estimated time of arrival of the autonomous ground based vehicle 202 at the transfer location, a destination location, item parameters (e.g., size, weight, engagement options), etc. The autonomous aerial vehicles, upon receiving the request, may determine an autonomous aerial vehicle that is available and capable of completing the delivery of the item, as requested by the autonomous ground based vehicle.

Determination of an autonomous aerial vehicle may be done in a variety of manners. For example, each autonomous aerial vehicle that receives the request may determine if it is available and capable of satisfying the request. Each autonomous vehicle that is available and capable may respond with one or more acceptance parameters. Acceptance parameters may include, for example, an estimated arrival time of the autonomous aerial vehicle at the transfer location, a remaining power of the autonomous aerial vehicle, transport capabilities, etc. Upon receiving the acceptances from one or more autonomous aerial vehicles, the autonomous ground based vehicle may select an autonomous aerial vehicle for transport of the item based on, for example, the acceptance parameters. As another example, a first responding autonomous aerial vehicle may be selected as the autonomous vehicle that is to transport the item.

Regardless of how the autonomous aerial vehicle is determined, the determined second autonomous aerial vehicle 204 aerially navigates to the transfer location 203, retrieves the item 210 from the autonomous ground based vehicle 202, and aerially transports the item past the obstacle and, in this example, to the destination location 207.

Figure 3:
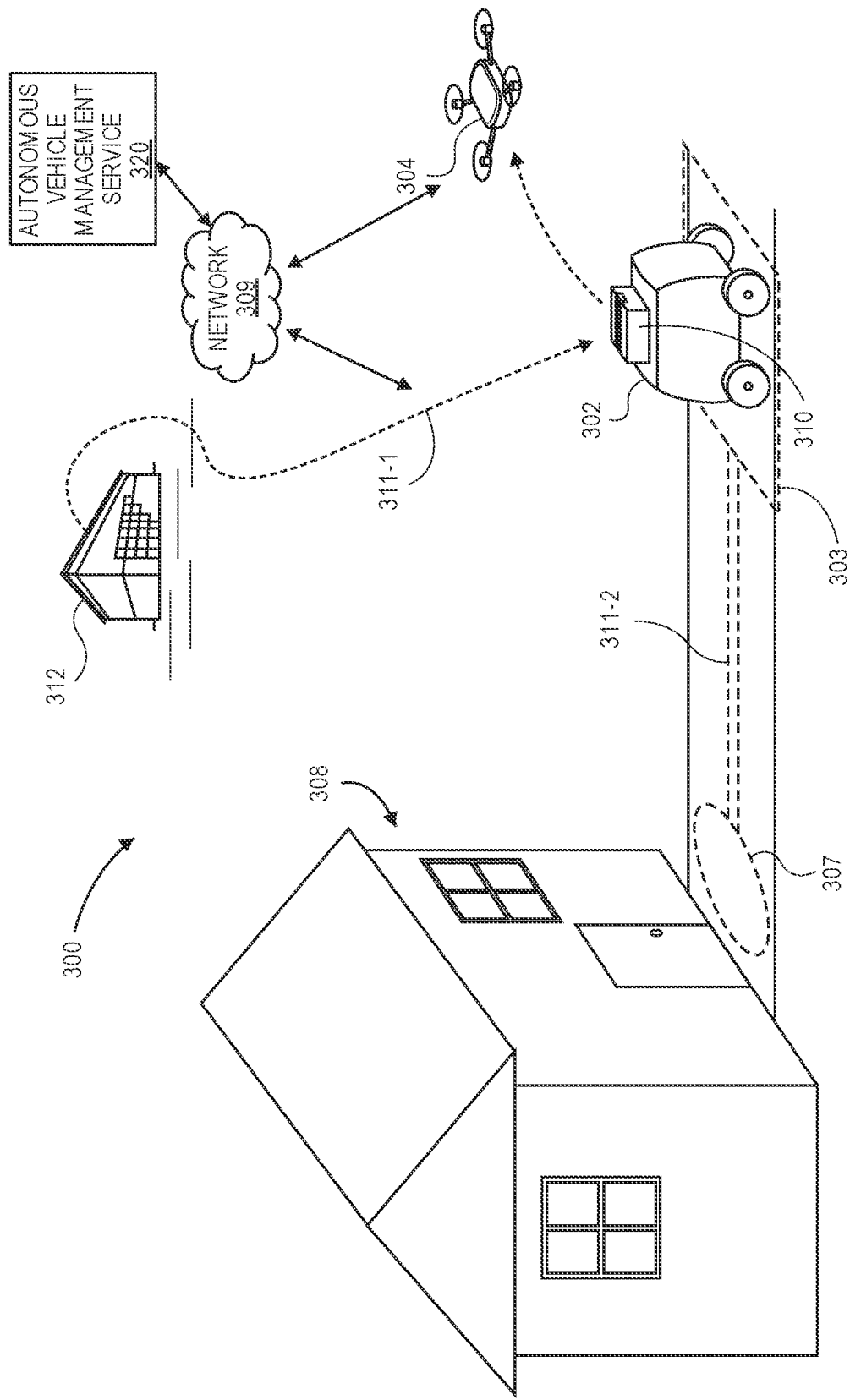

FIG. 3 illustrates another environment 300 in which an item 310 is transported along a navigation path 311 from a source location to a destination location using two or more autonomous vehicles, in accordance with the described implementations. Except where otherwise noted, reference numerals preceded by the number "3" in FIG. 3 refer to elements that are similar to elements having reference numerals preceded by the number "1" shown in FIG. 1 or the number "2" shown in FIG. 2.

Similar to the above examples, a customer has ordered an item 310 from an e-commerce website for delivery to a personal residence 308. As part of the delivery planning by the autonomous vehicle management system 320, a destination location 307 that is adjacent the personal residence 308 is determined and a navigation path is planned to transport the item from a source location 312, such as a fulfillment center, to the destination location. In comparison to the examples discussed with respect to FIGS. 1 and 2, in this example, an autonomous aerial vehicle 304 aerially transports the item 310 along a first portion of the navigation path 311-1 to a transfer location 303 and transfers the item from the autonomous aerial vehicle 304 to an autonomous ground based vehicle 302 positioned at the transfer location 303. The autonomous ground based vehicle 302 then transports the item 310 from the transfer location 303 along a second portion of the path 311-2 to the destination location 307 and completes delivery of the item 310 at the destination location 307.

Aerial navigation of the item and subsequent transfer of the item to an autonomous ground based vehicle 302 may be beneficial for a variety of reasons. For example, aerial transport of the item 310 by the autonomous aerial vehicle 304 from, for example a source location 312, to the transfer location 303, may be faster than ground based transport. For example, traditional ground based pathways (highways, road, streets, walkways) may be congested (obstacles) and/ or may not provide a direct or optimal path between the source location 312 and the destination location 307. As such, aerial transport along the first portion of the navigation path 311-1 may be preferred. Likewise, ground based transport of the item 310 by the autonomous ground based vehicle 302 from the transfer location 303 to the destination location 307 may be preferred for a variety of reasons. For example, the autonomous ground based vehicle 302 may be quieter, may be able to navigate into areas that are not easily accessible by autonomous aerial vehicles, the distance between the source location and destination location may exceed a distance that can be navigated by the autonomous aerial vehicle 304 (e.g., power limitations), etc.

As with the example illustrated in FIG. 1, the autonomous vehicle management system 320 may plan some or all of the transport of the item from the source location 312 to the destination location 307 and communicate over the network 309 with one or more of the autonomous ground based vehicle 302 and/or the autonomous aerial vehicle 304. As an alternative, or in addition thereto, as discussed with respect to FIG. 2, the autonomous ground based vehicle 302 and the autonomous aerial vehicle 304 may communicate directly and plan all or a portion of the navigation path, the transfer location, etc.

Figure 4:
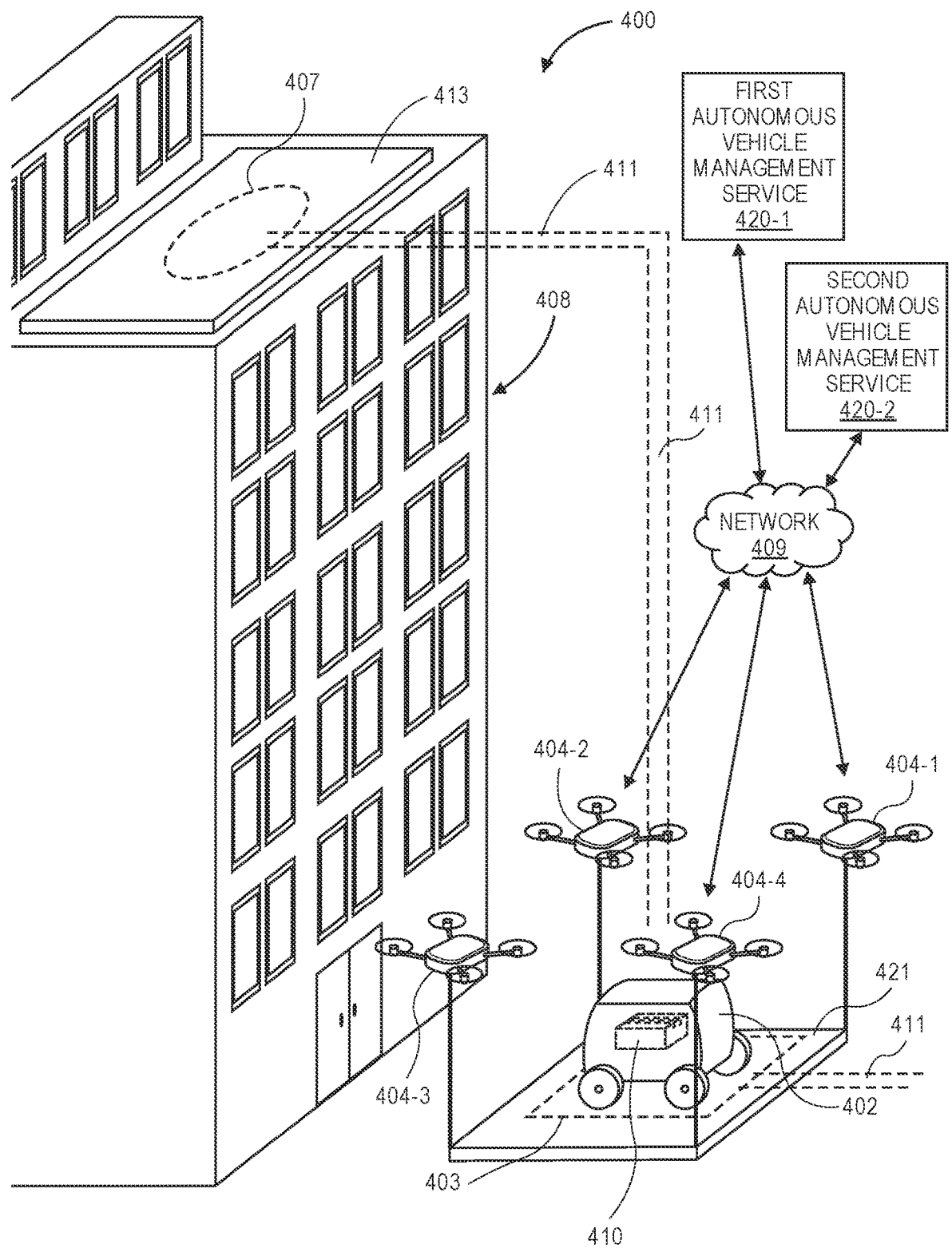

FIG. 4 illustrates another environment 400 in which multiple autonomous vehicles 402, 404 coordinate to transport an item 410 along a navigation path 411 to a destination location 407, in accordance with disclosed implementations. In this example, the destination location 407 is on a rooftop 413 of an apartment building 408. The navigation path 411 for transport of the item extends to a transfer location 403 that is positioned on a platform 421, extends vertically up from the transition location, and to the destination location 407. In comparison to the examples discussed above, rather than transferring the item from the first autonomous vehicle, in this example, the autonomous ground based vehicle 402, to a second autonomous vehicle for aerial transport along the vertical portion of the navigation path, the autonomous ground based vehicle 402 navigates to the transfer location 403 on the platform 421, and the platform 421, with the autonomous ground based vehicle 402 and the item 410 are aerially transported by autonomous aerial vehicles 404 vertically along the navigation path 411 so that the autonomous ground based vehicle 402 can complete delivery of the item at the destination location 407. In this example, the platform 421 is coupled to four autonomous aerial vehicles 404-1, 404-2, 404-3, and 404-4, that work in conjunction to aerially lift the autonomous ground based vehicle 402 and platform 421.

In other examples, rather than utilizing a platform, one or more autonomous aerial vehicles 404 may be configured to engage the autonomous ground based vehicle 402 directly and aerially transport the autonomous ground based vehicle along the vertical portion of navigation path 411.

In addition to utilizing autonomous aerial vehicles to aerially transport the autonomous ground based vehicle, in the illustrated example, multiple autonomous vehicle management systems 420 cooperate to enable delivery of the item to the destination location 407. Autonomous vehicles may be owned or controlled by different entities and/or services. For example, the autonomous ground based vehicle 402 may be owned and/or controlled by a first autonomous vehicle management service 420-1 and receive instructions via the network 409 from the first autonomous vehicle management service 420-1.

In comparison, the autonomous aerial vehicles 404 may be owned and/or controlled by a second autonomous vehicle management service 420-2 that communicates with the autonomous aerial vehicles 404 via the network 409. For example, the autonomous aerial vehicles 404 may be owned and/or controlled by a business that manages a plurality of autonomous vehicles and specializes in final delivery of items to delivery destinations. As another example, the autonomous aerial vehicles may be owned or controlled by the entity that owns or controls the apartment building 408. In such examples, the first autonomous vehicle management service 420-1 may send an indication to the second autonomous vehicle management service 420-2, via the network 409, indicating an item delivery, item parameters (e.g., size, weight), transfer location, destination location, and estimated arrival time at the transfer location, among other information. The second autonomous vehicle management service 420-2 may then determine and instruct the autonomous aerial vehicles 404 to navigate to and arrive at the transfer location 403 at the estimated arrival time, and complete transport of the item to the destination location. For example, the instructions from the second autonomous vehicle management service 420-2 may instruct the autonomous aerial vehicles 404 to vertically lift the platform to transport the autonomous ground based vehicle 402 vertically. As another example, the instructions from the second autonomous vehicle management service 420-2 may instruct an autonomous aerial vehicle to retrieve the item from an autonomous vehicle at the transfer location 403 and aerially transport the item from the transfer location to, for example, the destination location 407.

Figure 5:
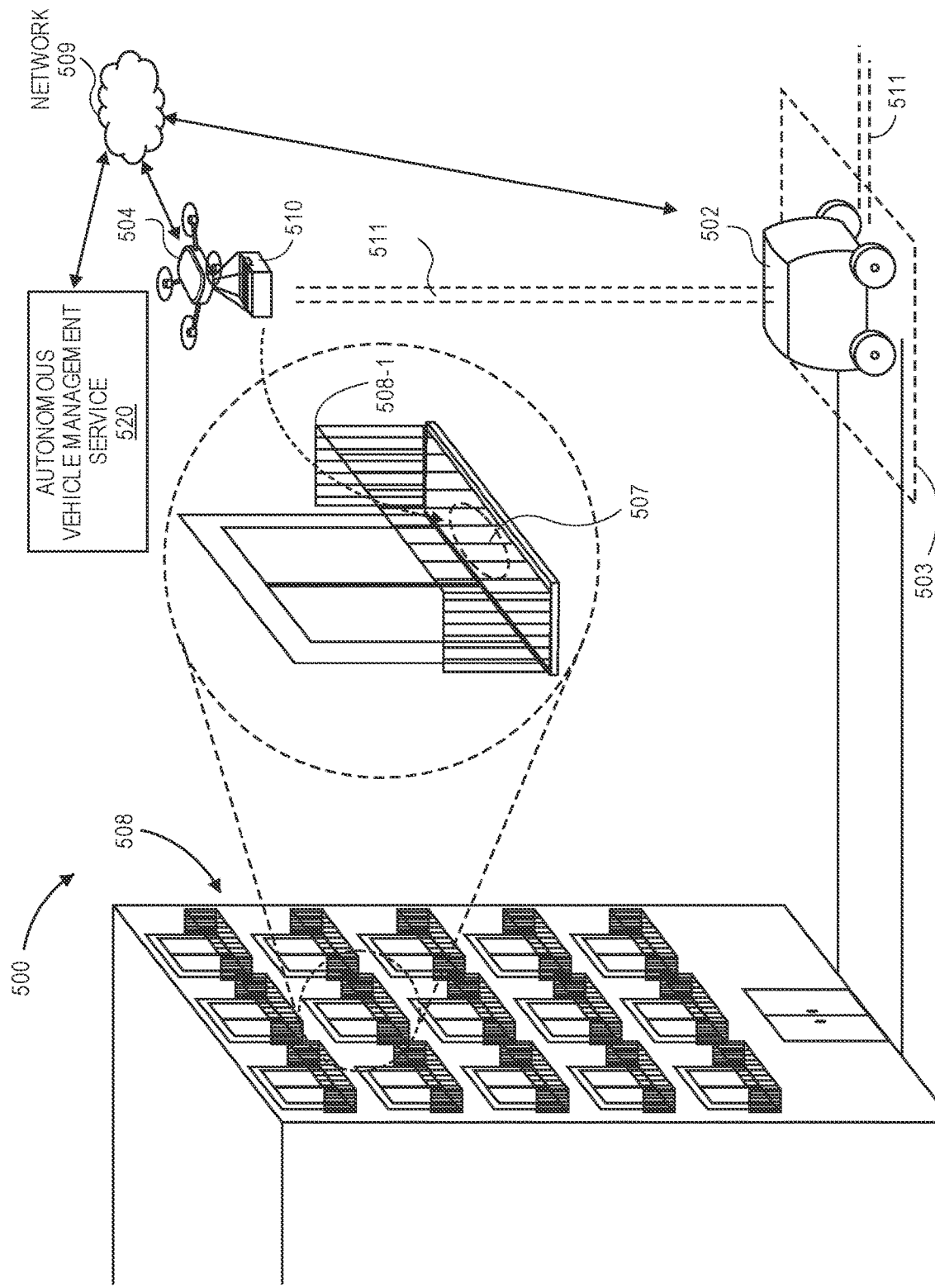

FIG. 5 illustrates another environment 500 in which multiple autonomous vehicles 502, 504 are utilized to transport an item 510 from a source location to a destination location, in accordance with described implementations. In this example, the destination location 507 is on an exterior balcony 508-1 of an apartment building 508. Because the balcony is several floors above the ground floor of the apartment building 508, the navigation path 511 includes a vertical component. Similar to the example discussed with respect to FIG. 4, the autonomous vehicle management service 520 sends instructions via the network 509 to the autonomous ground based vehicle 502 instructing the autonomous ground based vehicle to transport the item 510 to the transfer location 503. Likewise, the autonomous vehicle management service 520 sends instructions via the network 509 to the autonomous aerial vehicle 504 to retrieve the item 510 from the autonomous ground based vehicle 502 at the transfer location 503, aerially transport the item to the destination location 507, and complete delivery of the item 510 at the destination location.

Figure 6:
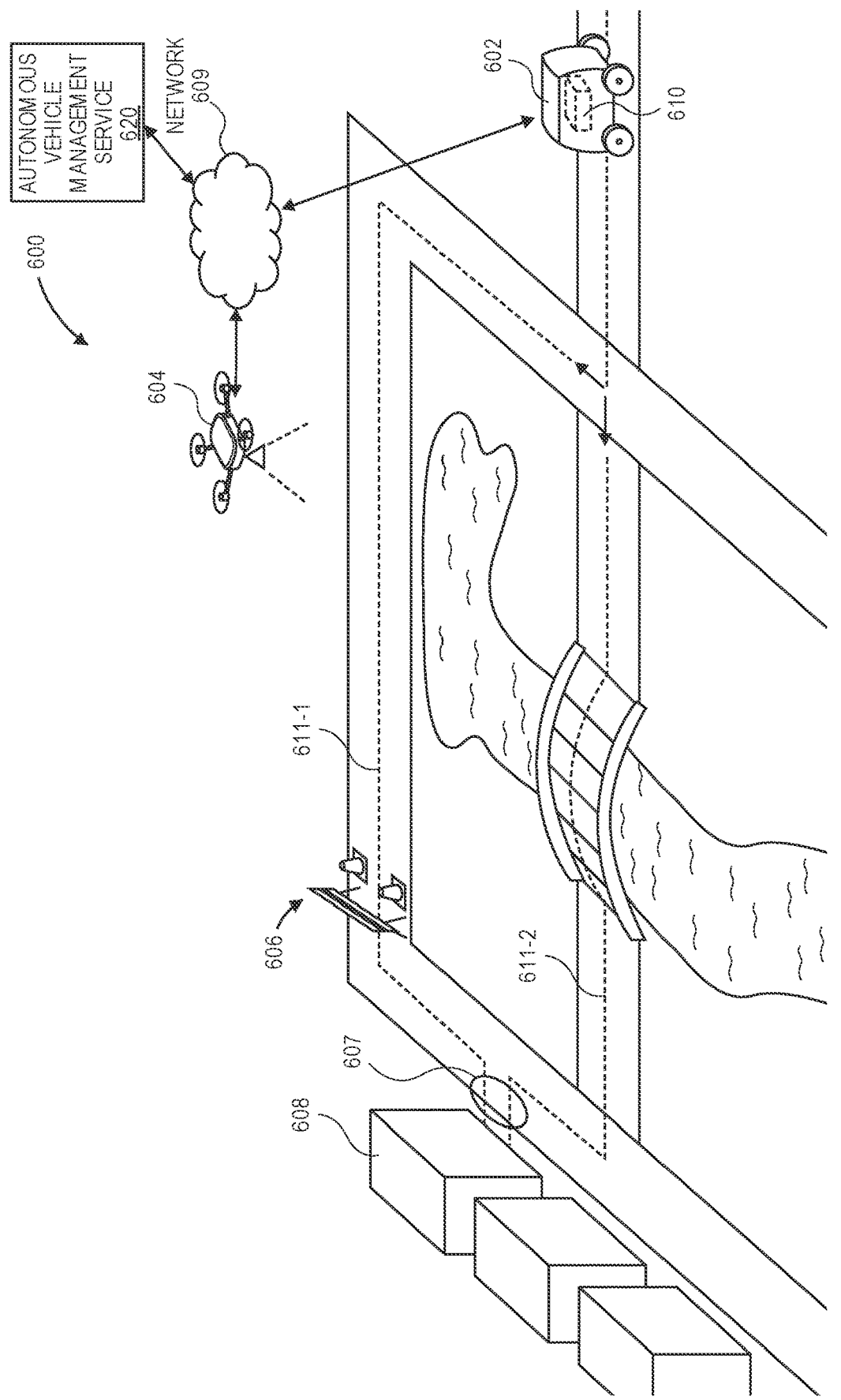

FIG. 6 illustrates another environment 600 in which multiple autonomous vehicles 602, 604 are utilized to transport an item 610 from a source location to a destination location 607. In this example, the destination location 607 is adjacent a building 608.

Rather than the item being transferred between two autonomous vehicles 602, 604, in this example, the autonomous vehicles communicate to determine a path for the autonomous ground based vehicle 602 to navigate to a destination location. For example, the autonomous aerial vehicle 604 may obtain images of the environment 600 and transmit those images via the network 609 to the autonomous vehicle management service 620 and/or to the autonomous ground based vehicle 602. The images of the environment 600 may be processed to detect obstacles 606 along potential navigation paths and/or to determine a navigation path for the autonomous ground based vehicle 602 to navigate. For example, two potential navigation paths 611-1, 611-2 may be available. Images from the autonomous aerial vehicle 604 may be obtained along both navigation paths and processed using one or more image processing algorithms to detect potential objects and/or obstacles 606 along the path. Based on the processed information, a navigation path, such as navigation path 611-2 may be selected for navigation by the autonomous ground based vehicle 602 to transport an item to the destination location 607.

Figure 7:
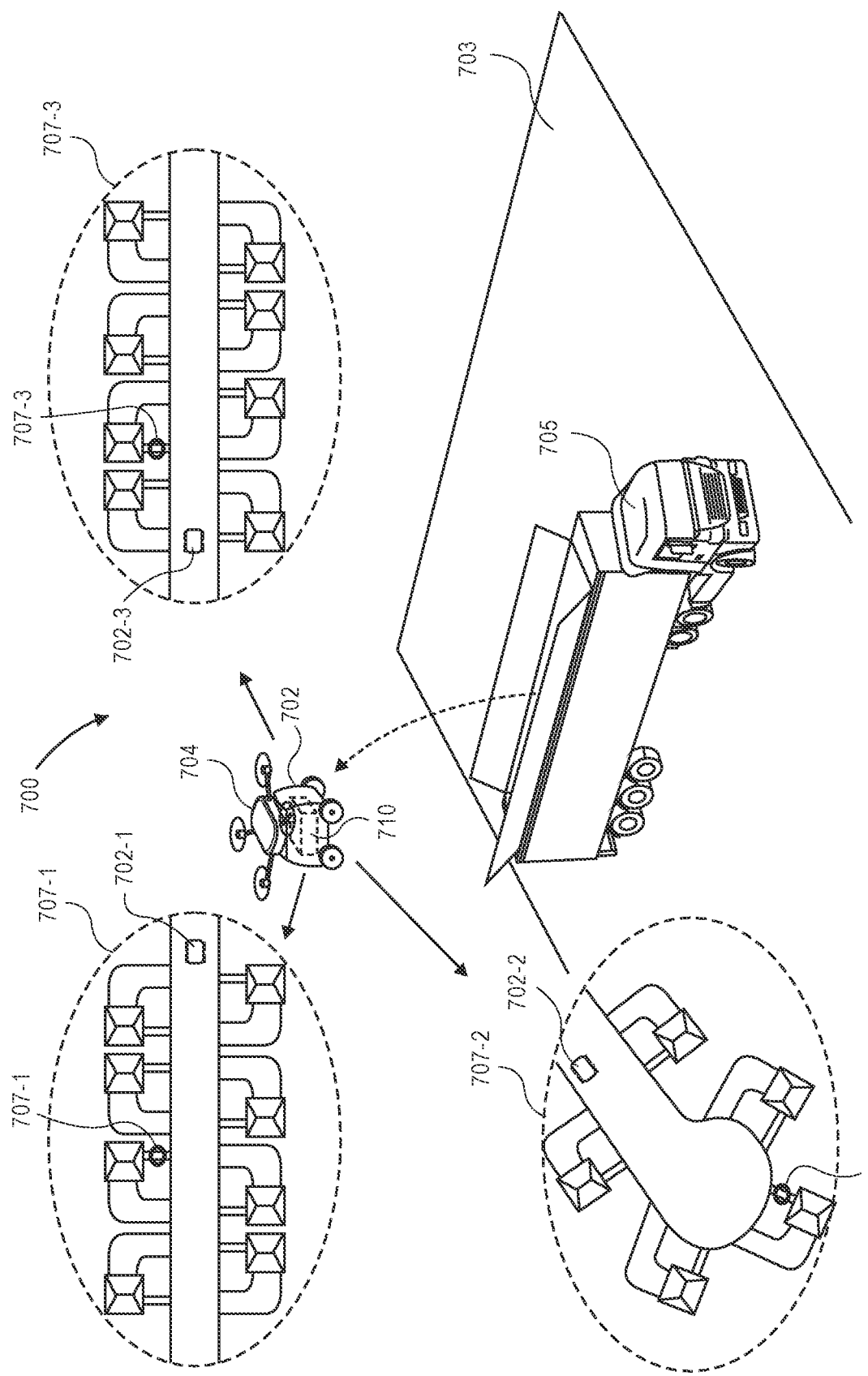

FIG. 7 is still another example environment 700 in which multiple autonomous vehicles are utilized to transport items to destination locations, in accordance with the described implementations. In this example, a transportation vehicle 705 may be loaded at a source location, such as a fulfillment center, with autonomous ground based vehicles that carry items to be delivered to destination locations within the environment 700. The transportation vehicle 705, when loaded, navigates to a transfer location 703 within the environment 700. The transfer location 703 may be any location, such as a parking lot, empty street, etc.

When the transportation vehicle 705 is at the transfer location, one or more autonomous aerial vehicles 704 may navigate to the transfer location 703 and transport the autonomous ground based vehicles 702, each carrying one or more items 710, from the transportation vehicle 705 to different locations within the environment so that the autonomous ground based vehicles 702 can navigate to different destination locations to deliver items 710 carried by those autonomous ground based vehicles 702. For example, an autonomous aerial vehicle 704, may aerially transport a first autonomous ground based vehicle 702-1 from the transportation vehicle 705 to a first area 707-1, such as a neighborhood, in which one or more destination locations 707-1 are specified for delivery of one or more items carried by the autonomous ground based vehicle 702-1. Likewise, the autonomous aerial vehicle 704, or another autonomous aerial vehicle, may aerially transport a second autonomous ground based vehicle 702-2 from the transportation vehicle 705 to a second area 707-2, such as a neighborhood, in which one or more destination locations 707-2 are specified for delivery of one or more items carried by the autonomous ground based vehicle 702-2. The autonomous aerial vehicle 704, or another autonomous aerial vehicle, may also aerially transport a third autonomous ground based vehicle 702-3 from the transportation vehicle 705 to a third area 707-3, such as a neighborhood, in which one or more destination locations 707-3 are specified for delivery of one or more items carried by the autonomous ground based vehicle 702-3.

As will be appreciated, any number of autonomous ground based vehicles may be transported from the transportation vehicle 705 to different locations within the environment. Likewise, any number of autonomous aerial vehicles may be used to transport autonomous ground based vehicles from the transportation vehicle 705. Still further, in some implementations, after an autonomous ground based vehicle has completed delivery of items to different locations within the environment, autonomous aerial vehicles may retrieve those autonomous ground based vehicles and aerially transport those autonomous ground based vehicles back to the transportation vehicle 705, or to another location.

Figure 8A:
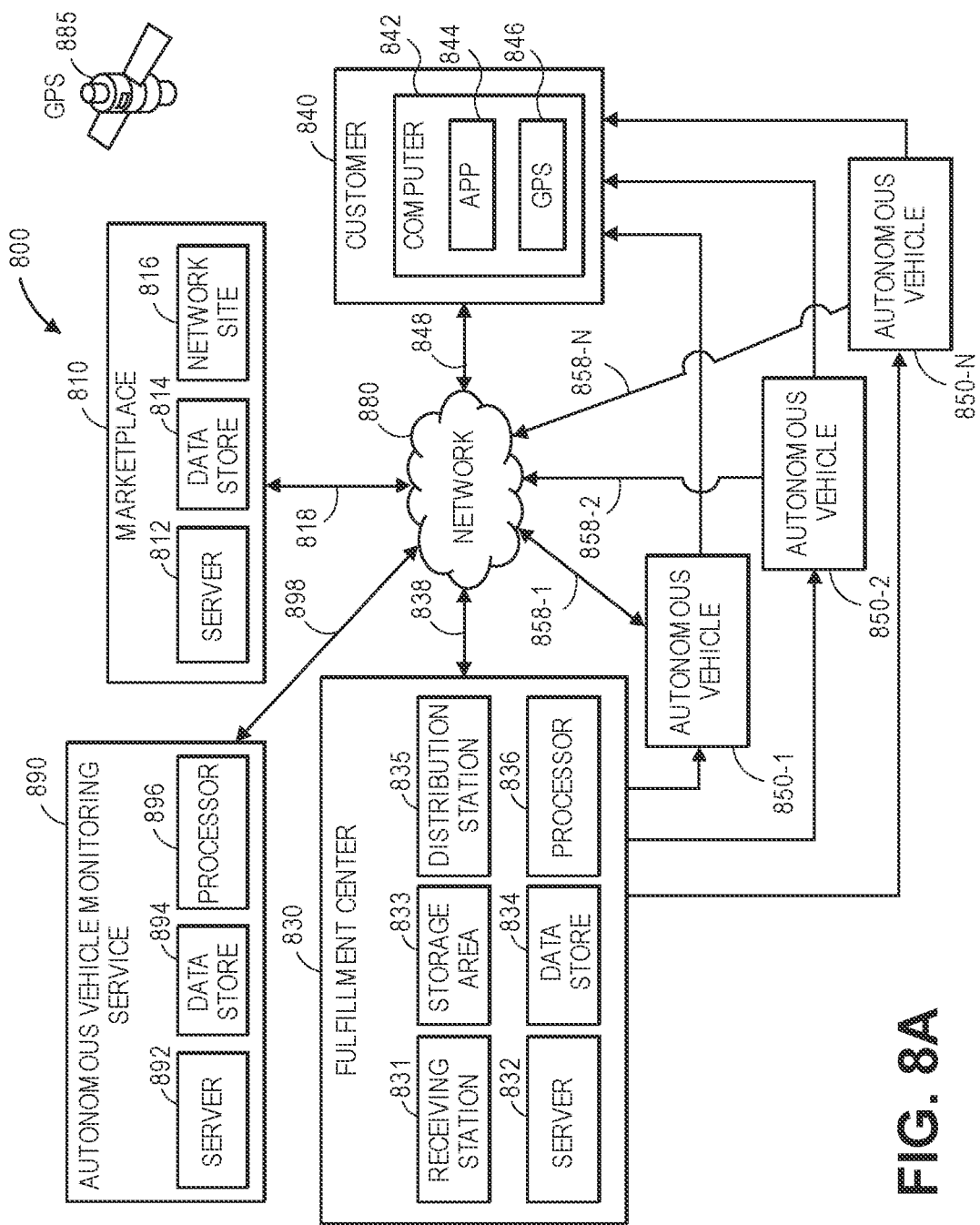
FIGS. 8A and 8B are block diagrams of components of one system, in accordance with implementations of the present disclosure.
Figure 8B:
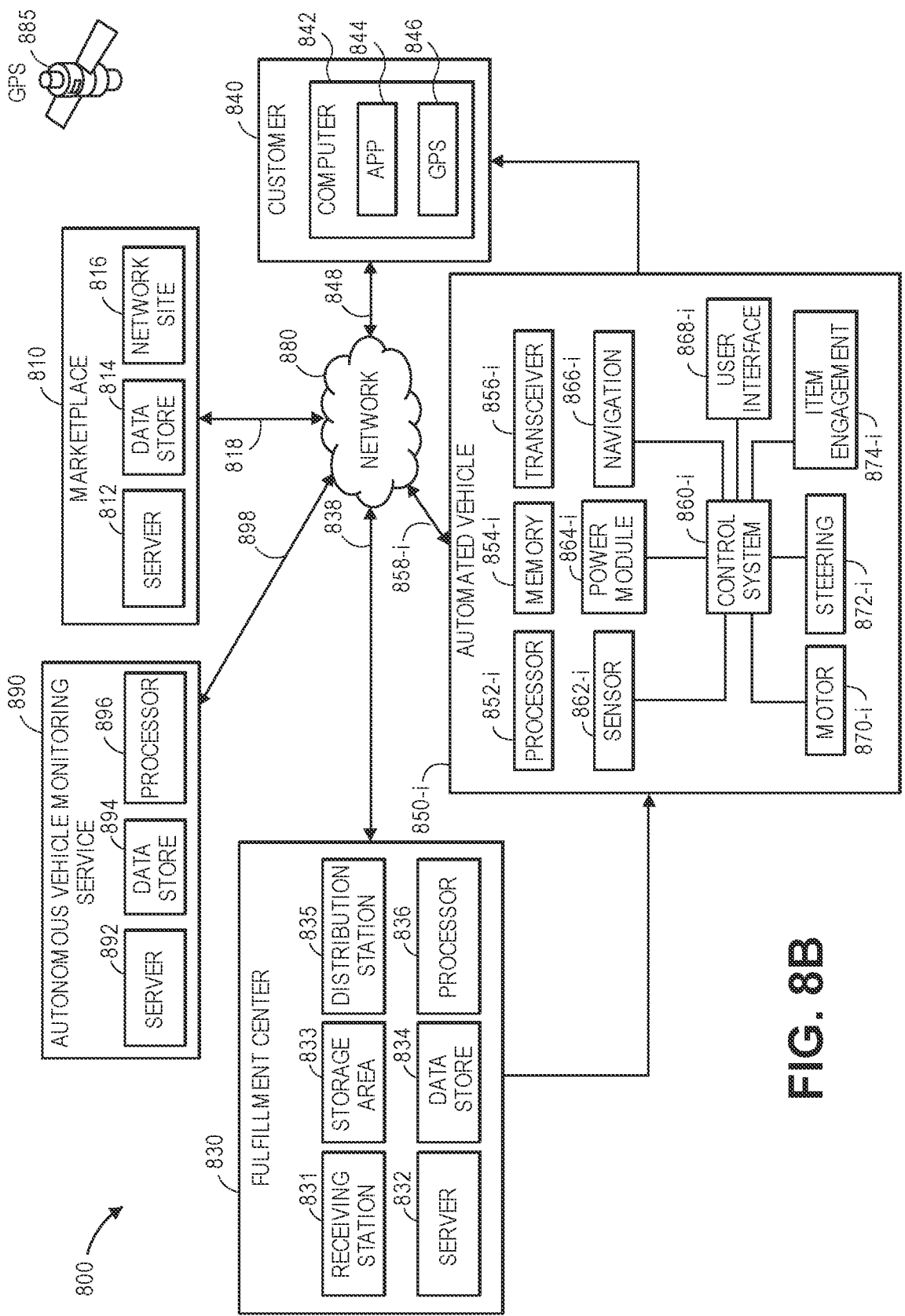

Referring to FIGS. 8A and 8B, a block diagram of components of one system 800, in accordance with implementations of the present disclosure is shown. The system 800 includes a marketplace 810, a fulfillment center 830, a customer 840, a plurality of autonomous vehicles 850-1, 850-2 . . . 850-n and an autonomous vehicle monitoring service 890 that are connected to one another across a communications network 880, which may include the Internet in whole or in part.

The marketplace 810 may be any entity or individual that wishes to make items from a variety of sources (e.g., vendors, manufacturers, merchants or sellers) available for download, purchase, rent, lease or borrowing by customers using a networked computer infrastructure, including one or more physical computer servers 812 and data stores 814 (e.g., databases) for hosting a network site 816, such as an electronic commerce website. The marketplace 810 may be physically or virtually associated with one or more storage or distribution facilities, such as the fulfillment center 830. The network site 816 may be implemented using the one or more servers 812, which connect or otherwise communicate with the one or more data stores 814 as well as the communications network 880, as indicated by line 818, through the sending and receiving of digital data. Moreover, the data store 814 may include any type of information regarding items that have been made available for sale through the marketplace 810, or ordered by customers, such as the customer 840, from the marketplace 810, or any information or data regarding the delivery of such items to the customers, e.g., by one or more of the autonomous vehicles 850-1, 850-2 . . . 850-n.

The fulfillment center 830 may be any facility that is adapted to receive, store, process and/or distribute items. As is shown in FIG. 8A, the fulfillment center 830 includes a server 832, a data store 834, and one or more computer processors 836. The fulfillment center 830 also includes stations for receiving, storing and distributing items to customers, including but not limited to a receiving station 831, a storage area 833 and a distribution station 835.

The server 832 and/or the processors 836 may operate one or more order processing and/or communication systems and/or software applications having one or more user interfaces, or communicate with one or more other computing devices or machines that may be connected to the communications network 880, as indicated by line 838, in order to transmit or receive information in the form of digital or analog data, or for any other purpose. For example, the server 832 and/or the processors 836 may also operate or provide access to one or more reporting systems for receiving or displaying information or data regarding orders for items received by the marketplace 810, or deliveries made by one or more of the autonomous vehicles 850-1, 850-2 . . . 850-n, and may provide one or more interfaces for receiving interactions (e.g., text, numeric entries or selections) from one or more operators, users, workers or other persons in response to such information or data. The server 832, the data store 834 and/or the processor 836 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

The receiving station 831 may include any apparatuses that may be required in order to receive shipments of items at the fulfillment center 830 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as autonomous aerial vehicles), and preparing such items for storage or distribution to customers. The storage area 833 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 835 may include one or more regions or stations where items that have been retrieved from a designated storage area may be evaluated, prepared and packed for delivery from the fulfillment center 830 to addresses, locations or destinations specified by customers, e.g., by way of one or more of the autonomous vehicles 850-1, 850-2 . . . 850-n, as well as carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 831 may be processed, and the items placed into storage within the storage areas 833 or, alternatively, transferred directly to the distribution station 835, or "cross-docked," for prompt delivery to one or more customers.

The fulfillment center 830 may further include one or more control systems that may generate instructions for conducting operations at one or more of the receiving station 831, the storage area 833 or the distribution station 835. Such control systems may be associated with the server 832, the data store 834 and/or the processor 836, or with one or more other computing devices or machines, and may communicate with the receiving station 831, the storage area 833 or the distribution station 835 within the fulfillment center 830 by any known wired or wireless means, or with the marketplace 810, the customer 840 or one or more of the autonomous vehicles 850-1, 850-2 . . . 850-n over the communications network 880, as indicated by line 838, through the sending and receiving of digital data.

Additionally, the fulfillment center 830 may include one or more systems or devices for determining locations of one or more elements therein, such as cameras or other image recording devices. Furthermore, the fulfillment center 830 may also include one or more workers or staff members, who may handle or transport items within the fulfillment center 830. Such workers may operate one or more computing devices or machines for registering the receipt, retrieval, transportation or storage of items within the fulfillment center, or a general-purpose device such as a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 840 may be any entity or individual that wishes to download, purchase, rent, lease, borrow or otherwise obtain items (which may include goods, products, services or information of any type or form) from the marketplace 810, e.g., for delivery by one or more of the autonomous vehicles 850-1, 850-2 . . . 850-n. The customer 840 may utilize one or more computing devices 842 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 844, such as a web browser or a shopping application, and may be connected to or otherwise communicate with the marketplace 810, the fulfillment center 830 or the autonomous vehicles 850-1, 850-2 . . . 850-n through the communications network 880, as indicated by line 848, by the transmission and receipt of digital data. The computing device 842 may also communicate with a navigation system 885 and obtain position information that is used to determine a position or location of the computing device 842.

The autonomous vehicles 850-1, 850-2 . . . 850-n may be any type or form of self-powered vehicle capable of being programmed or otherwise configured for autonomous travel, in furtherance of the performance of one or more tasks or operations, such as the delivery of an item from the fulfillment center 830, a source location, to the customer 840, a destination location, based on one or more computer instructions. Each of the autonomous vehicles 850-1, 850-2 . . . 850-n shown in FIG. 8A, which are represented in FIG. 8B as an autonomous vehicle 850-i, may include one or more computer components such as a processor 852-i, a memory 854-i and a transceiver 856-i in communication with one or more other computer devices that may be connected to the communications network 880, as indicated by line 858-i, in order to transmit or receive information in the form of digital or analog data, or for any other purpose. For example, the autonomous vehicle 850-i may receive instructions or other information or data via the transceiver 856-i regarding an item that is to be delivered from the fulfillment center 830 to the customer 840 via one or more paths of a navigable path network from the marketplace server 812, the fulfillment center server 832 and/or the customer computing device 842, or from any other computing device over the communications network 880. The transceiver 856-i may be configured to enable the aerial vehicle 804 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the communications network 880 or directly.

The transceiver 856-i may further include or be in communication with one or more input/output (or "I/O") interfaces, network interfaces and/or input/output devices, and may be configured to allow information or data to be exchanged between one or more of the components of the autonomous vehicle 850-i, or to one or more other computer devices or systems (e.g., other aerial vehicles) via the communications network 880. For example, in some implementations, the transceiver 856-i may be configured to coordinate I/O traffic between the processor 852-i and one or more onboard or external computer devices or components.

The transceiver 856-i may perform any necessary protocol, timing or other data transformations in order to convert data signals from a first format suitable for use by one component into a second format suitable for use by another component. In some implementations, the transceiver 856-i may include support for devices attached through various types of peripheral buses, e.g., variants of the Peripheral Component Interconnect (PCI) bus standard or the Universal Serial Bus (USB) standard. In some other implementations, functions of the transceiver 856-i may be split into two or more separate components, or incorporated directly into the processor 852-i.

As is also shown in FIG. 8B, the autonomous vehicle 850-i further includes one or more control systems 860-i, as well as one or more sensors 862-i, one or more power modules 864-i, one or more navigation modules 866-i, and one or more user interfaces 868-i. Additionally, the autonomous vehicle 850-i further includes one or more motors 870-i, one or more steering systems 872-i and one or more item engagement systems (or devices) 874-i.

The control system 860-i may include one or more software applications or hardware components configured for controlling or monitoring operations of one or more components such as the sensor 862-i, the power module 864-i, the navigation module 866-i, or the user interfaces 868-i, as well as the motors 870-i, the steering systems 872-i and the item engagement systems 874-i, e.g., by receiving, generating, storing and/or transmitting one or more computer instructions to such components. The control system 860-i may communicate with the marketplace 810, the fulfillment center 830 and/or the customer 840 over the communications network 880, as indicated by line 858-i, through the sending and receiving of digital data.

The sensor 862-i may be a position sensor such as a GPS receiver in communication with one or more orbiting satellites or other components of a GPS system 885, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous vehicle 850-i. Geolocations of the sensor 862-i may be associated with the autonomous vehicle 850-i, where appropriate.

The sensor 862-i may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous vehicle 850-i, or for any other purpose. For example, the sensor 862-i may be configured to capture or detect reflected light if the reflected light is within a field of view of the sensor 862-i, which is defined as a function of a distance between an imaging sensor and a lens within the sensor 862-i, viz., a focal length, as well as a location of the sensor 862-i and an angular orientation of the lens. Accordingly, where an object appears within a depth of field, or a distance within the field of view where the clarity and focus is sufficiently sharp, the sensor 862-i may capture light that is reflected off objects of any kind to a sufficiently high degree of resolution using one or more sensors thereof, and store information regarding the reflected light in one or more data files.

The sensor 862-i may also include manual or automatic features for modifying a field of view or orientation. For example, the sensor 862-i may be a digital camera configured in a fixed position, or with a fixed focal length (e.g., fixed-focus lenses) or angular orientation. Alternatively, the sensor 862-i may include one or more actuated or motorized features for adjusting a position of the sensor 862-i, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 862-i, or a change in one or more of the angles defining the angular orientation of the sensor 862-i.

For example, the sensor 862-i may be an imaging device that is hard-mounted to a support or mounting that maintains the imaging device in a fixed configuration or angle with respect to one, two or three axes. Alternatively, however, the sensor 862-i may be provided with one or more motors and/or controllers for manually or automatically operating one or more of the components, or for reorienting the axis or direction of the sensor 862-i, i.e., by panning or tilting the sensor 862-i. Panning the sensor 862-i may cause a rotation within a horizontal plane or about a vertical axis (e.g., a yaw), while tilting the sensor 862-i may cause a rotation within a vertical plane or about a horizontal axis (e.g., a pitch). Additionally, the sensor 862-i may be rolled, or rotated about its axis of rotation, and within a plane that is perpendicular to the axis of rotation and substantially parallel to a field of view of the sensor 862-i.

Imaging data (e.g., still or moving images, as well as associated audio data or metadata) captured using the sensor 862-i may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 862-i may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 862-i may also be an item identification sensor, may including a bar code scanner, a radiofrequency identification (or RFID) reader, or other technology that is utilized to determine an identification of an item that is being retrieved or deposited, or has been retrieved or deposited, by the autonomous vehicle 850-i. In some implementations, the sensor 862-i may be provided within a cargo bay or other storage component of the autonomous vehicle 850-i, such as a presence detection sensor and/or a motion sensor for detecting the presence or absence of one or more objects within the cargo bay or storage compartment, or movement of objects therein.

The sensor 862-i may be further configured to capture, record and/or analyze information or data regarding its positions, velocities, accelerations or orientations of the autonomous vehicle 850-i, and to analyze such data or information by one or more means, e.g., by aggregating or summing such data or information to form one or more qualitative or quantitative metrics of the movement of the sensor 862-i. For example, a net vector indicative of any and all relevant movements of the autonomous vehicle 850-i, including but not limited to physical positions, velocities, accelerations or orientations of the sensor 862-i, may be derived. Additionally, coefficients or scalars indicative of the relative movements of the autonomous vehicle 850-i may also be defined.

The power module 864-i may be any type of power source for providing electrical power, mechanical power, solar power, and/or other forms of power in support of one or more electrical or mechanical loads aboard the autonomous vehicle 850-i. In some implementations, the power module 864-i may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 864-i may each have any cell voltages, peak load currents, charge times, specific energies, internal resistances or cycle lives, or other power ratings. The power module 864-i may also be any type, size or form of other power source, e.g., other than a battery, including but not limited to one or more fuel cells, turbines, solar cells or nuclear reactors. Alternatively, the power module 864-i may be another form of prime mover (e.g., electric, gasoline-powered or any other type of motor) capable of generating sufficient mechanical forces for the autonomous vehicle 850-i.

The navigation module 866-i may include one or more software applications or hardware components including or having access to information or data regarding aspects of a navigation path and/or a navigable path network that includes the navigation paths, including the locations, dimensions, capacities, conditions, statuses or other attributes of the various navigation paths of a navigable path network. For example, the navigation module 866-i may receive inputs from the sensor 862-i, e.g., from a GPS receiver, an imaging device or another sensor, and determine an optimal direction and/or an optimal speed of the autonomous vehicle 850-i for travelling on a given navigation path based on such inputs. The navigation module 866-i may select a navigation path to be traveled upon by the autonomous vehicle 850-i, and may provide information or data regarding the selected navigation path to the control system 860-i.

The user interface 868-i may be configured to receive and provide information to human users of the autonomous vehicle **850-*i* and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous vehicle 850-*i* and a human user. In various implementations, the user interface 868-*i* may include a variety of different features. For example, in one implementation, the user interface 868-*i* may include a relatively small display and/or a keypad for receiving inputs from human users. In other implementations, inputs for controlling the operation of the autonomous vehicle 850-*i* may be provided remotely. For example, in order to access a storage compartment, a human user may send a text message to or reply to a text message from the control system 860-*i* and request that a door or other access portal be opened in order to enable the user to access an item therein. In various implementations, the autonomous vehicle 850-*i*** may have capabilities for directly receiving such signals from a user device or other device (e.g., a device inside a user's residence) that provides a signal to open the storage compartment door.

The motor **870-*i* may be any type or form of motor or engine (e.g., electric, gasoline-powered or any other type of motor) that is capable of providing sufficient rotational forces to one or more axles, shafts, propellers, and/or wheels for causing the autonomous vehicle 850-*i* and any items therein to travel in a desired direction, at a desired speed, and/or at a desired altitude. In some implementations, the autonomous vehicle 850-*i*** may include one or more electric motors having any number of stators, poles and/or windings, such as an outrunner or an inrunner brushless direct current (DC) motor, or any other motors, having any speed rating, power rating or any other rating.

The steering system **872-*i* may be any system for controlling a direction of travel of the autonomous vehicle 850-*i* and/or altitude of the autonomous vehicle. The steering system 872-*i* may include any number of automatically operable gears (e.g., racks and pinions), gear boxes, shafts, shaft assemblies, joints, servos, hydraulic cylinders, linkages, electrical speed controls (ESC), and/or other features to cause the autonomous vehicle 850-*i*** to travel in a desired direction and/or at a desired altitude.

The item engagement system **874-*i* may be any mechanical component, e.g., a robotic arm, for engaging an item or for disengaging the item, as desired. For example, when the autonomous vehicle 850-*i* is tasked with delivering an item from a source location to a destination location, the item engagement system 874-*i* may be used to engage the item at the source location and to deposit the item in a cargo bay or other storage compartment prior to departing. After the autonomous vehicle 850-*i* arrives at the destination location, or another location (e.g., transfer location), the item engagement system 874-*i* may be used to retrieve the item within the cargo bay or storage compartment, deposit the item in a desired location at the destination location and/or enable the transfer of the item from the autonomous vehicle 850-*i*** to another autonomous vehicle.

In some implementations, the autonomous vehicle **850-*i* may be programmed or configured to perform one or more missions or tasks in an integrated manner. For example, the control system 860-*i* may be programmed to instruct the autonomous vehicle 850-*i* to travel to a source location, e.g., the fulfillment center 830, and to begin the performance of a task there, such as by retrieving an item at the source location using the item engagement system 874-*i*, before proceeding to a destination location, e.g., the customer 840, along a selected navigation path. Along the way, the control system 860-*i* may cause the motor 870-*i* to operate at any predetermined speed and cause the steering system 872-*i* to orient the autonomous vehicle 850-*i* in a predetermined direction or otherwise as necessary to travel along the selected navigation path, e.g., based on information or data received from or stored in the navigation module 866-*i*. The control system 860-*i* may further cause the sensor 862-*i* to capture information or data (including but not limited to imaging data) regarding the autonomous vehicle 850-*i* and/or its surroundings along the selected navigation path. The control system 860-*i* or one or more other components of the autonomous vehicle 850-*i*** may be programmed or configured as necessary in order to execute any actions associated with a given task, in accordance with the present disclosure.

Any combination of networks or communications protocols may be utilized in accordance with the systems and methods of the present disclosure. For example, each of the automated vehicles **850-1, 850-2 . . . 850-*n* may be configured to communicate with one another or with the marketplace server 812, the fulfillment center server 832 and/or the customer computer 842 via the communications network 880, such as is shown in FIGS. 8A and 8B, e.g., via an open or standard protocol such as Wi-Fi. Alternatively, each of the autonomous vehicles 850-1, 850-2 . . . 850-*n* may be configured to communicate with one another directly outside of a centralized network, such as the communications network 880, e.g., by a wireless protocol such as Bluetooth, in which two or more of the autonomous vehicles 850-1, 850-2 . . . 850-*n*** may be paired with one another.

The autonomous vehicle monitoring service 890 includes one or more physical computer servers 892 having a plurality of databases 894 associated therewith, as well as one or more computer processors 896 provided for any specific or general purpose. The servers 892 may be connected to or otherwise communicate with the databases 894 and the processors 896. The databases 894 may store any type of information or data, including but not limited to acoustic signals, information or data relating to acoustic signals, or information or data regarding personnel and/or their attributes, interests or preferences, for any purpose. The servers 892 and/or the computer processors 896 may also connect to or otherwise communicate with the communications network 880, as indicated by line 898, through the sending and receiving of digital data. For example, the autonomous vehicle monitoring service 890 may include any facilities, stations or locations having the ability or capacity to receive and store information or data in one or more data stores, e.g., data files received from any of the autonomous vehicles **850-1, 850-2 . . . 850-*n*, one or more other external computer systems via the communications network 880. In some implementations, the data processing system may be provided in a physical location. In other such implementations, the data processing system may be provided in one or more alternate or virtual locations, e.g., in a "cloud"-based environment. In still other implementations, the autonomous vehicle monitoring service 890 may be provided onboard one or more of the autonomous vehicles 850-1, 850-2 . . . 850-*n***.

For example, the autonomous vehicle monitoring service 890 of FIG. 8 may be independently provided for the purpose of defining a navigable path network having a plurality of points based on attributes of a given mission or task, attributes of one or more of the autonomous vehicles **850-1, 850-2 . . . 850-*n*, or attributes of physical and/or geographic features within a given environment, including but not limited to locations and dimensions or other attributes of roads, sidewalks, crosswalks, bicycle or walking paths, bridges or trails, obstacles, or non-traditional transportation infrastructure, such as parks, fields, forests, lots, clearings or other spaces. The number and/or type of physical and/or geographic features that may be evaluated and considered for inclusion in a navigable path network by the autonomous vehicle monitoring service 890**, and the number and/or type of points that may be included in such a navigable path network, are not limited.

In some implementations, the autonomous vehicle monitoring service 890 of FIG. 8 may also be provided for the purpose of receiving, tracking and/or otherwise monitoring the operations of one or more of the autonomous vehicles 850-1, 850-2 . . . 850-*n*, including but not limited to any information or data regarding attributes of the autonomous vehicles 850-1, 850-2 . . . 850-*n*, or missions or tasks being performed by the autonomous vehicles 850-1, 850-2 . . . 850-*n*, as well as environmental conditions, traffic conditions, ground or surface conditions, weather conditions, planned or ongoing construction or other events, detected obstacles, or any other factors that may affect the capacity of one or more navigation paths within a navigable path network.

For example, the autonomous vehicle monitoring service 890 may receive information or data regarding a mission or task to be performed, e.g., a delivery of an item from a source location to a destination location, and may identify a plurality of navigation paths between two or more of the points of a navigable path network, and may select one or more of such navigation paths as an optimal navigation path for the execution of the mission or task by one or more of the autonomous vehicles 850-1, 850-2 . . . 850-*n*. The autonomous vehicle monitoring service 890 may further provide instructions to one or more of the autonomous vehicles 850-1, 850-2 . . . 850-*n*, indicating a navigation path to be traveled between two or more of the points of the navigable path network, including times and dates at which an autonomous vehicle has arrived at or departed from one or more of such points. The autonomous vehicle monitoring service 890 may be further configured to receive information or data regarding changes to any of the attributes regarding a given mission or task, changes to any of the attributes of any of the autonomous vehicles 850-1, 850-2 . . . 850-*n*, or changes to any of the attributes of the physical and/or geographic features of the environment in which the navigable path network is provided. Information or data regarding such changes may be received from any intrinsic or extrinsic sources, including but not limited to one or more networked computer systems, e.g., over the communications network 880, or from one or more of the autonomous vehicles 850-1, 850-2 . . . 850-*n*. For example, the autonomous vehicle monitoring service 890 may include information or data such as a speed, a course, a position (e.g., a latitude and a longitude), an elevation, an angle of orientation (e.g., a yaw, a pitch or a roll) of an autonomous vehicle, as well as information or data regarding environmental or surface conditions, traffic conditions, congestion or any other relevant factors regarding the capacity of a given navigation path of the navigable path network.

The autonomous vehicle monitoring service 890 may also be configured to determine whether a navigation path being traveled by one or more of the autonomous vehicles 850-1, 850-2 . . . 850-*n* remains optimal or preferred for a given autonomous vehicle, or to communicate instructions for varying the navigation path and/or transferring the item to another autonomous vehicle at the transfer location. The autonomous vehicle monitoring service 890 may further utilize any available information or data in determining a capacity of a given path of the navigable path network, or whether such capacity may have increased or decreased, or whether a path is to be added to the navigable path network or removed therefrom. The number and/or type of information or data that may be received and/or processed or utilized by the autonomous vehicle monitoring service 890 are not limited.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center," a "customer," an "autonomous vehicle," a "vehicle monitoring service" or like terms, may be automated steps performed by their respective computer systems, or implemented within software modules (or computer programs) executed by one or more general purpose computers. Moreover, process steps described as being performed by a "marketplace," a "fulfillment center," a "customer," an "autonomous vehicle" or a "vehicle monitoring service" may be performed by a human operator, but could, alternatively, be performed by an automated agent.

The marketplace 810, the fulfillment center 830, the customer 840, the autonomous vehicles 850-1, 850-2 . . . 850-*n* or the autonomous vehicle monitoring service 890 may use any web-enabled or Internet applications or features, or any other client-server applications or features including electronic mail (or E-mail), or other messaging techniques, to connect to the communications network 880 or to communicate with one another, such as through short or multimedia messaging service (SMS or MMS) text messages. For example, the fulfillment center 830 and/or the server 832 may be adapted to transmit information or data in the form of synchronous or asynchronous messages to the marketplace 810 and/or the server 812, the customer 840 and/or the computing device 842, the autonomous vehicles 850-1, 850-2 . . . 850-*n* and/or the control system 860-*i* or the autonomous vehicle monitoring service 890, or any other computer device in real time or in near-real time, or in one or more offline processes, via the communications network 880. Those of ordinary skill in the pertinent art would recognize that the marketplace 810, the fulfillment center 830, the customer 840, the autonomous vehicles 850-1, 850-2 . . . 850-*n* or the autonomous vehicle monitoring service 890 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 812, 832, 892, the computing devices 842, the processors 852-$i$, 896, or any other computers or control systems utilized by the marketplace 810, the fulfillment center 830, the customer 840, the autonomous vehicles 850-1, 850-2 . . . 850-$n$, the autonomous vehicle monitoring service 890, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

FIG. 9A illustrates a view of one autonomous ground based vehicle 902 configured for ground based travel, in accordance with implementations of the present disclosure. As is shown in FIG. 9A, the autonomous ground based vehicle 902 includes a frame 952, a storage compartment 957, a pair of axles 973 and a plurality of wheels 971 joined to the axles 973. A front surface of the frame 952 includes an imaging device 962-1 having a field of view aligned in a forward direction or orientation with respect to the autonomous ground based vehicle 902 and an array of lights 967. As will be appreciated, the autonomous ground based vehicle 902 may include any number of imaging devices 962-1, with fields of view that may be permanently or adjustably aligned in any direction or orientation with respect to the autonomous ground based vehicle 902. In some implementations, the autonomous ground based vehicle 902 may include any number of lights, on any surface thereof, and one or more of the lights may include light emitting diodes (LEDs) or other light sources. The autonomous ground based vehicle 902 may also include one or more speakers 962-3 and/or one or more microphones 962-4 positioned about the frame of the autonomous ground based vehicle 902.

As illustrated in FIG. 9A, an upper surface of the frame 952 may include a door 953 providing access to the storage compartment 957 that is rotatably connected by a pair of hinges 959. The door 953 may include any number of manual or automatic features for causing the opening or closing thereof, and may include any suitable dimensions with respect to the dimensions of the storage compartment 957. In some implementations, the autonomous ground based vehicle 902 may include doors 953 on any surface thereof, and any number of storage compartments 957 of any size or shape.

Figure 9B:
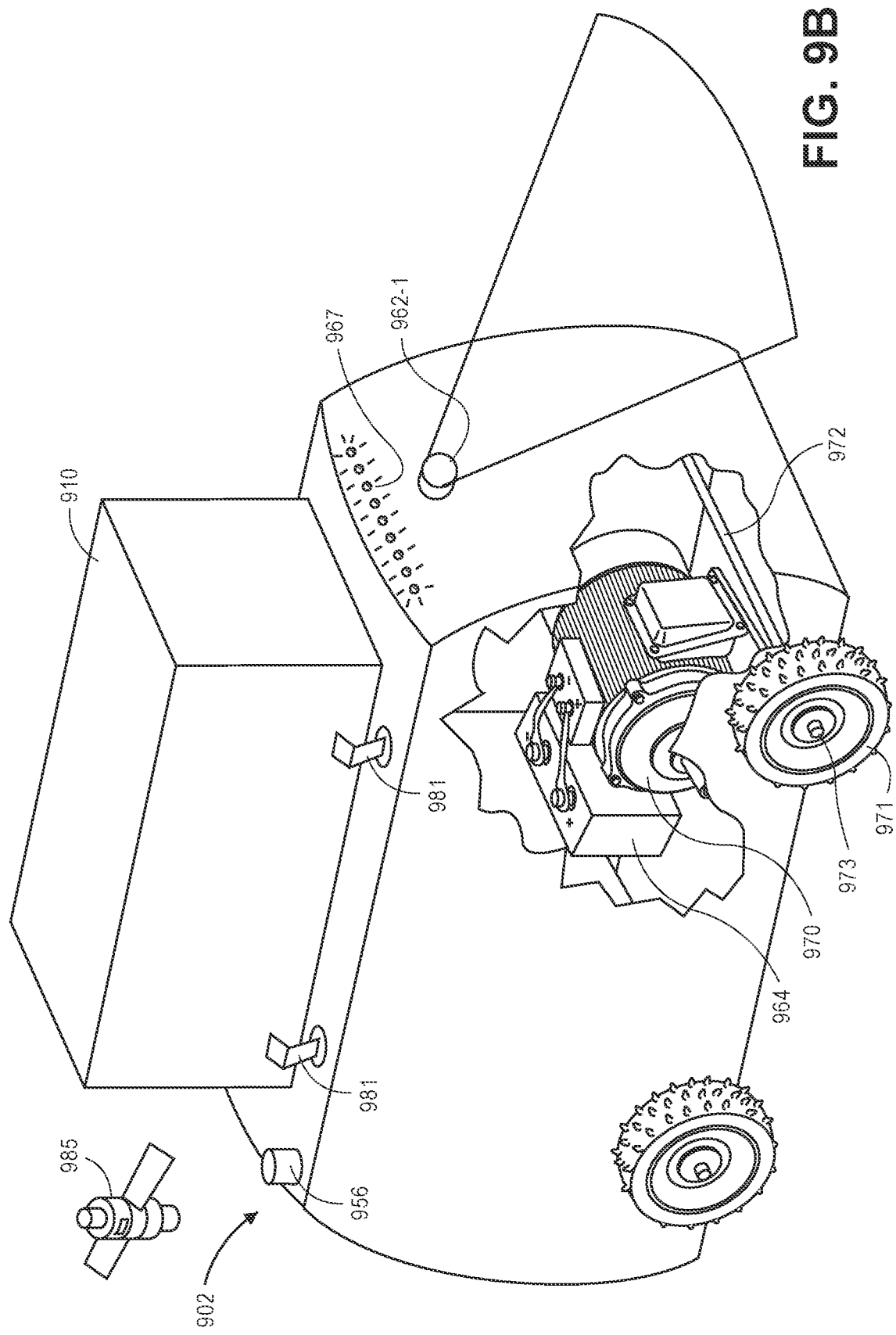

In other implementations, as illustrated in FIG. 9B, rather than or in addition to an internal storage compartment 957, the autonomous ground based vehicle 902 may be configured to selectively engage and/or disengage a payload 910 (also referred to herein as an item). For example, the autonomous vehicle may include a plurality of engagement members 981 that may be moved between an engagement position in which the payload is engaged by the engagement members 981 and secured to the autonomous vehicle and a disengagement position in which the payload 910 may be removed from the autonomous vehicle. While the example illustrated with respect to FIG. 9B illustrates the payload and engagement member on the upper side or top of the autonomous vehicle, in other implementations, the payload engagement members 981 may be positioned elsewhere on the autonomous vehicle to engage and disengage payloads.

The upper surface of the frame 952 further includes a transceiver 956 (e.g., a Wi-Fi transmitter and receiver) for communicating with a network 980, which may include the Internet in whole or in part, as well as a GPS receiver 962-2, which may receive geolocation data from or transmit geolocation data to a GPS network 985. The upper surface of the frame 952 further includes a user interface 968 which may receive interactions from a human user, or display information to the human user, as appropriate. In some implementations, the GPS receiver 962-2, and/or the user interface 968 may be provided on any other surface of the frame 952.

As is shown in FIG. 9A, the autonomous ground based vehicle 902 may include a power module 964 (e.g., a battery), a motor 970 (e.g., a DC electric motor operating at twelve to forty-eight volts) and a steering component 972 (e.g., one or more racks or pinions for automatically changing a direction of travel of the autonomous ground based vehicle 902 and/or an orientation of one or more of axles 973 or the wheels 971. The motor 970 may be configured to operate at any speed or have any power rating, and to cause the autonomous ground based vehicle 902 to travel in a forward direction of travel, a reverse direction of travel or in any other direction of travel as determined by the steering component 972. Additionally, the axles 973 and wheels 971 of the autonomous ground based vehicle 902 may also have any dimension. For example, the wheels 971 may have bores or axle pads for accommodating axles 973 of any diameter or thickness, and any number of spokes or other extensions for supporting a rim having any desired spacings or offsets for accommodating tires or other coverings. Each of the axles 973 may be joined to and configured to rotate any number of wheels 971, which may include tires or other coverings of any suitable material, including but not limited to rubbers and/or plastics. The wheels 971 or tires thereon may feature any number of belts, walls, treads or other components, and may be pneumatic or solid, or take any other form.

Figure 9C:
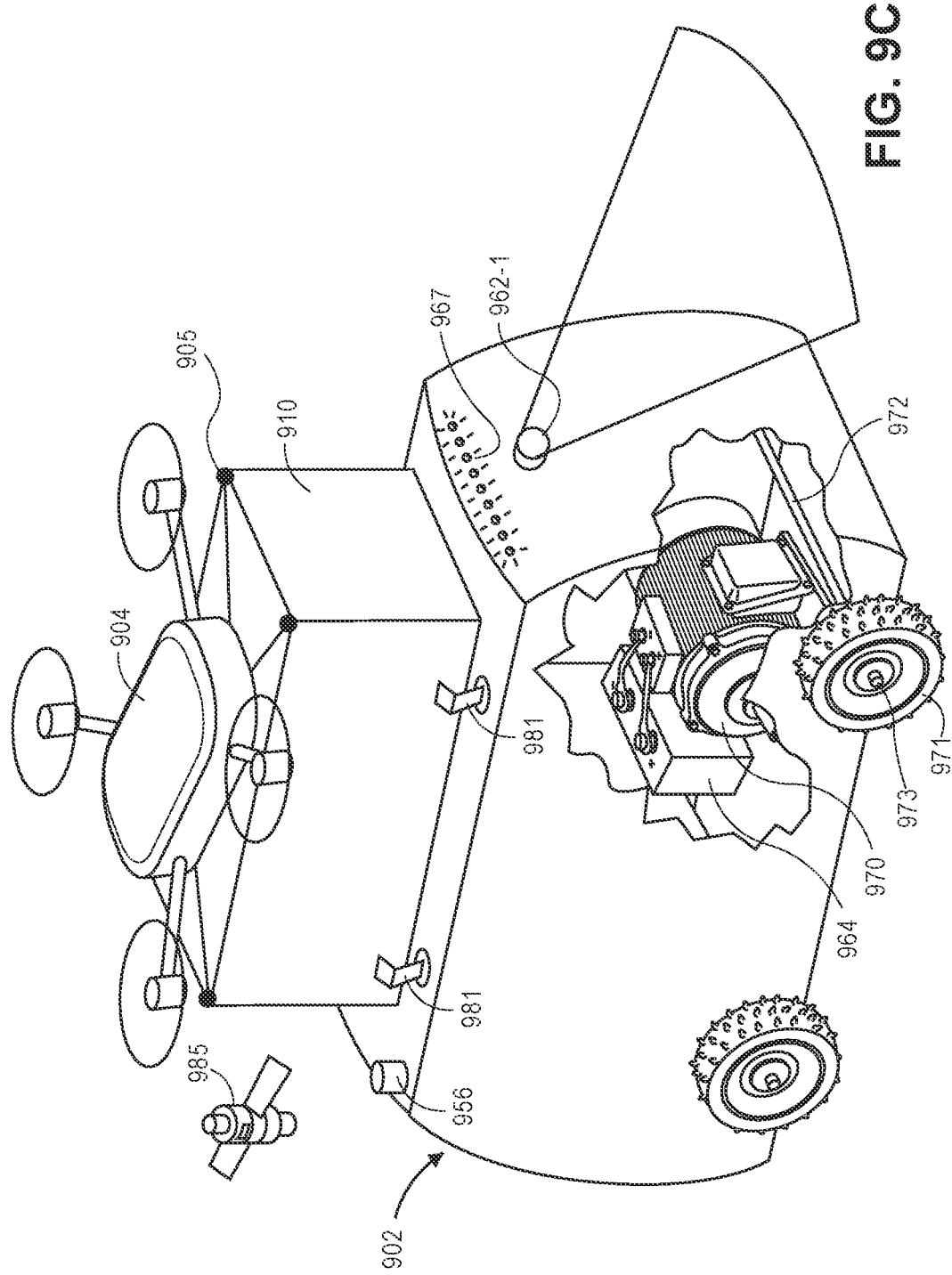

In still another example, as illustrated in FIG. 9C, rather than or in addition to an internal storage compartment 957, the autonomous ground based vehicle 902 may be configured to selectively engage and/or disengage a payload 910 and/or to transport an autonomous aerial vehicle 904. For example, the autonomous ground based vehicle 902 may include a plurality of engagement members 981 that may be moved between an engagement position in which the payload is engaged by the engagement members 981 and secured to the autonomous ground based vehicle 902 and a disengagement position in which the payload 910 may be removed from the autonomous ground based vehicle 902. Likewise, the autonomous aerial vehicle 904 may engage with the payload 910 via one or more connection members 905 and be transported along with the payload by the autonomous ground based vehicle 902. While the example illustrated with respect to FIG. 9C illustrates the payload and engagement between the payload and the autonomous aerial vehicle 904 being engaged by connection members 905 that are coupled to different corners of the payload 910, in other implementations the connection between the payload and the autonomous aerial vehicle 904 may be different. For example, the autonomous aerial vehicle 904 may couple to the autonomous ground based vehicle 902 and secure the payload 910 between the two autonomous vehicles.

Figure 10:
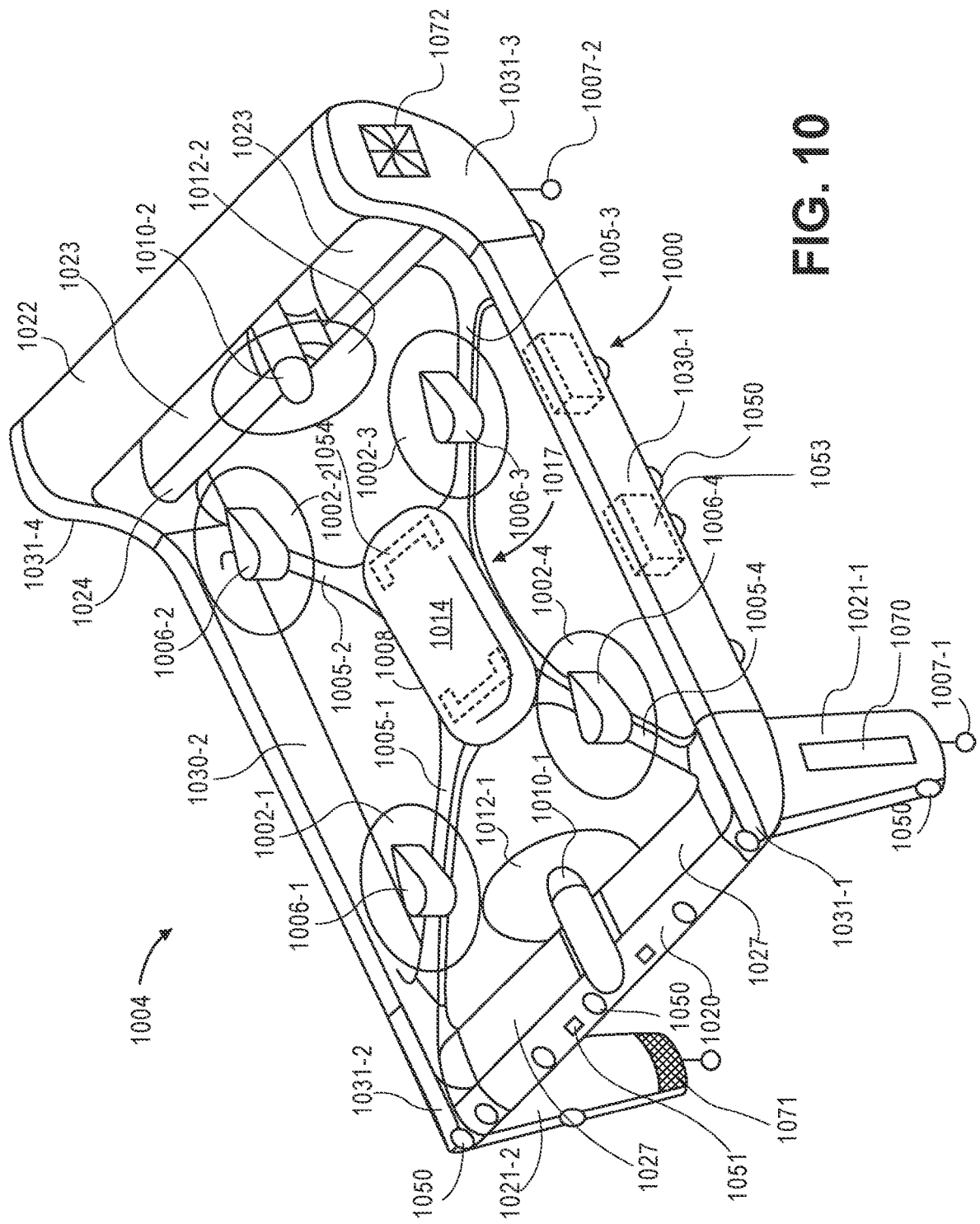
FIG. 10 is a view of an autonomous aerial vehicle, in accordance with implementations of the present disclosure.

FIG. 10 illustrates a view of an autonomous aerial vehicle 1004, in this instance a UAV, in accordance with described implementations. As illustrated, the autonomous aerial vehicle 1004 includes a perimeter frame 1000 that includes a front wing 1020, a lower rear wing 1024, an upper rear wing 1022, and two horizontal side rails 1030-1, 1030-2. The horizontal side rails 1030 are coupled to opposing ends of the front wing 1020 and opposing ends of the upper rear wing 1022 and lower rear wing 1024. In some implementations, the coupling may be with a corner junction, such as the front left corner junction 1031-1, the front right corner junction 1031-2, the rear left corner junction 1031-3, and the rear right corner junction 1031-4. In such an example, the corner junctions are also part of the perimeter frame 1000.

The components of the perimeter frame 1000, such as the front wing 1020, lower rear wing 1024, upper rear wing 1022, side rails 1030-1, 1030-2, and corner junctions 1031 may be formed of any one or more suitable materials, such as graphite, carbon fiber, aluminum, titanium, etc., or any combination thereof. In the illustrated example, the components of the perimeter frame 1000 of the autonomous aerial vehicle 1004 are each formed of carbon fiber and joined at the corners using corner junctions 1031. The components of the perimeter frame 1000 may be coupled using a variety of techniques. For example, if the components of the perimeter frame 1000 are carbon fiber, they may be fitted together and joined using secondary bonding, a technique known to those of skill in the art. In other implementations, the components of the perimeter frame 1000 may be affixed with one or more attachment mechanisms, such as screws, rivets, latches, quarter-turn fasteners, etc., or otherwise secured together in a permanent or removable manner.

The front wing 1020, lower rear wing 1024, and upper rear wing 1022 are positioned in a tri-wing configuration and each wing provides lift to the autonomous aerial vehicle 1004 when the autonomous aerial vehicle is moving in a direction that includes a horizontal component. For example, the wings may each have an airfoil shape that causes lift due to the airflow passing over the wings during horizontal flight.

Opposing ends of the front wing 1020 may be coupled to a corner junction 1031, such as the front left corner junction 1031-1 and front right corner junction 1031-2. In some implementations, the front wing may include one or more flaps 1027, or ailerons, that function as a steering component and may be used to adjust the pitch, yaw, and/or roll of the autonomous aerial vehicle 1004 alone or in combination with the lifting motors 1006, lifting propellers 1002, thrusting motors 1010, thrusting propellers 1012, and/or other flaps on the rear wings, discussed below. In some implementations, the flaps 1027 may also be used as a protective shroud to hinder access to the lifting propellers 1002 by objects external to the autonomous aerial vehicle 1004. For example, when the autonomous aerial vehicle 1004 is moving in a vertical direction or hovering, the flaps 1027 may be extended to increase a height of the protective barrier around a portion of the lifting propellers 1002.

In some implementations, the front wing 1020 may include two or more pairs of flaps 1027, as illustrated in FIG. 10. In other implementations, for example, if there is no front thrusting motor 1010-1, the front wing 1020 may only include a single flap 1027 that extends substantially the length of the front wing 1020. If the front wing 1020 does not include flaps 1027, the lifting motors 1006 and lifting propellers 1002, thrusting motors 1010, thrusting propellers 1012 and/or flaps of the rear wings may function as the steering component and be utilized to control the pitch, yaw, and/or roll of the autonomous aerial vehicle 1004 during flight.

Opposing ends of the lower rear wing 1024 may be coupled to a corner junction 1031, such as the rear left corner junction 1031-3 and rear right corner junction 1031-4. In some implementations, the lower rear wing may include one or more flaps 1023 or ailerons that may be used to adjust the pitch, yaw and/or roll of the autonomous aerial vehicle 1004 alone or in combination with the lifting motors 1006, lifting propellers 1002, thrusting motors 1010, thrusting propellers 1012, and/or the flaps 1027 of the front wing. In some implementations, the flaps 1023 may also be used as a protective shroud to further hinder access to the lifting propellers 1002 by objects external to the autonomous aerial vehicle 1004. For example, when the autonomous aerial vehicle 1004 is moving in a vertical direction or hovering, the flaps 1023 may be extended, similar to the extending of the front flaps 1027 of the front wing 1020.

In some implementations, the rear wing 1024 may include two or more flaps 1023, as illustrated in FIG. 10, or two or more pairs of flaps, respectively. In other implementations, for example, if there is no rear thrusting motor 1010-2 mounted to the lower rear wing, the rear wing 1024 may only include a single flap 1023 that extends substantially the length of the lower rear wing 1024. In other implementations, if the lower rear wing includes two thrusting motors, the lower rear wing may be configured to include three flaps 1023, one on either end of the lower rear wing 1024, and one between the two thrusting motors mounted to the lower rear wing 1024.

Opposing ends of the upper rear wing 1022 may be coupled to a corner junction 1031, such as the rear left corner junction 1031-3 and rear right corner junction 1031-4. In some implementations, like the lower rear wing, the upper rear wing 1022 may include one or more flaps or ailerons that may be used to adjust the pitch, yaw and/or roll of the autonomous aerial vehicle 1004 alone or in combination with the lifting motors 1006, lifting propellers 1002, thrusting motors 1010, thrusting propellers 1012, and/or other flaps of other wings. In some implementations, the flaps may also be used as a protective shroud to further hinder access to the lifting propellers 1002 by objects external to the autonomous aerial vehicle 1004. For example, when the autonomous aerial vehicle 1004 is moving in a vertical direction or hovering, the flaps may be extended, similar to the extending of the front flaps 1027 of the front wing 1020 or the flaps 1023 of the lower rear wing 1024.

The front wing 1020, lower rear wing 1024, and upper rear wing 1022 may be positioned and sized proportionally to provide stability to the autonomous aerial vehicle while the autonomous aerial vehicle 1004 is moving in a direction that includes a horizontal component. For example, the lower rear wing 1024 and the upper rear wing 1022 are stacked vertically such that the vertical lift vectors generated by each of the lower rear wing 1024 and upper rear wing 1022 are close together. In comparison, the front wing 1020 is separated from the rear wings longitudinally such that the vertical lift vector generated by the front wing 1020 acts together with the vertical lift vectors of the lower rear wing 1024 and the upper rear wing 1022, providing efficiency, stabilization and control.

In some implementations, to further increase the stability and control of the autonomous aerial vehicle 1004, one or more winglets 1021, or stabilizer arms, may also be coupled to and included as part of the perimeter frame 1000. In the example illustrated with respect to FIG. 10, there are two front winglets 1021-1 and 1021-2 mounted to the underneath side of the front left corner junction 1031-1 and the front right corner junction 1031-2, respectively. The winglets 1021 extend in a downward direction approximately perpendicular to the front wing 1020 and side rails 1030. Likewise, the two rear corner junctions 1031-3, 1031-4 are also formed and operate as winglets providing additional stability and control to the autonomous aerial vehicle 1004 when the autonomous aerial vehicle 1004 is moving in a direction that includes a horizontal component.

The winglets 1021 and the rear corner junctions 1031 may have dimensions that are proportional to the length, width, and height of the autonomous aerial vehicle 1004 and may be positioned based on the approximate center of gravity of the autonomous aerial vehicle 1004 to provide stability and control to the autonomous aerial vehicle 1004 during horizontal flight.

Coupled to the interior of the perimeter frame 1000 is a central frame 1017. The central frame 1017 includes a hub 1008 and motor arms 1005 that extend from the hub 1008 and couple to the interior of the perimeter frame 1000. In this example, there is a single hub 1008 and four motor arms 1005-1, 1005-2, 1005-3, and 1005-4. Each of the motor arms 1005 extend from approximately a corner of the hub 1008 and couple or terminate into a respective interior corner of the perimeter frame. In some implementations, each motor arm 1005 may couple into a corner junction 1031 of the perimeter frame 1000. Like the perimeter frame 1000, the central frame 1017 may be formed of any suitable material, such as graphite, carbon fiber, aluminum, titanium, etc., or any combination thereof. In this example, the central frame 1017 is formed of carbon fiber and joined at the corners of the perimeter frame 1000 at the corner junctions 1031. Joining of the central frame 1017 to the perimeter frame 1000 may be done using any one or more of the techniques discussed above for joining the components of the perimeter frame 1000.

Lifting motors 1006 are coupled at approximately a center of each motor arm 1005 so that the lifting motor 1006 and corresponding lifting propeller 1002 are within the substantially rectangular shape of the perimeter frame 1000. In one implementation, the lifting motors 1006 are mounted to an underneath or bottom side of each motor arm 1005 in a downward direction so that the propeller shaft of the lifting motor that mounts to the lifting propeller 1002 is facing downward. In other implementations, as illustrated in FIG. 10, the lifting motors 1006 may be mounted to a top of the motor arms 1005 in an upward direction so that the propeller shaft of the lifting motor that mounts to the lifting propeller 1002 is facing upward. In this example, there are four lifting motors 1006-1, 1006-2, 1006-3, 1006-4, each mounted to an upper side of a respective motor arm 1005-1, 1005-2, 1005-3, and 1005-4.

In some implementations, multiple lifting motors may be coupled to each motor arm 1005. For example, while FIG. 10 illustrates a quad-copter configuration with each lifting motor mounted to a top of each motor arm, a similar configuration may be utilized for an octo-copter. For example, in addition to mounting a motor 1006 to an upper side of each motor arm 1005, another lifting motor may also be mounted to an underneath side of each motor arm 1005 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 1002 to lift the autonomous aerial vehicle 1004 and any engaged payload, thereby enabling aerial transport of the payload.

Mounted to each lifting motor 1006 is a lifting propeller 1002. The lifting propellers 1002 may be any form of propeller (e.g., graphite, carbon fiber) and of a size sufficient to lift the autonomous aerial vehicle 1004 and any payload engaged by the autonomous aerial vehicle 1004 so that the autonomous aerial vehicle 1004 can navigate through the air, for example, to deliver a payload to a destination location. For example, the lifting propellers 1002 may each be carbon fiber propellers having a dimension or diameter of twenty-four inches. While the illustration of FIG. 10 shows the lifting propellers 1002 all of a same size, in some implementations, one or more of the lifting propellers 1002 may be different sizes and/or dimensions. Likewise, while this example includes four lifting propellers 1002-1, 1002-2, 1002-3, 1002-4, in other implementations, more or fewer propellers may be utilized as lifting propellers 1002. Likewise, in some implementations, the lifting propellers 1002 may be positioned at different locations on the autonomous aerial vehicle 1004. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the autonomous aerial vehicle.

In addition to the lifting motors 1006 and lifting propellers 1002, the autonomous aerial vehicle 1004 may also include one or more thrusting motors 1010 and corresponding thrusting propellers 1012. The thrusting motors and thrusting propellers may be the same or different than the lifting motors 1006 and lifting propellers 1002. For example, in some implementations, the thrusting propellers may be formed of carbon fiber and be approximately eighteen inches long. In other implementations, the thrusting motors may utilize other forms of propulsion to propel the autonomous aerial vehicle. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 1000 and central frame 1017 of the autonomous aerial vehicle 1004 and utilized to increase the efficiency of flight that includes a horizontal component. For example, when the autonomous aerial vehicle 1004 is traveling in a direction that includes a horizontal component, the thrusting motors may be engaged to produce a horizontal thrust force via the thrusting propellers to propel the autonomous aerial vehicle 1004 horizontally. As a result, the speed and power utilized by the lifting motors 1006 may be reduced. Alternatively, in selected implementations, the thrusting motors may be oriented at an angle greater or less than ninety degrees with respect to the perimeter frame 1000 and the central frame 1017 to provide a combination of thrust and lift.

In the example illustrated in FIG. 10, the autonomous aerial vehicle 1004 includes two thrusting motors 1010-1, 1010-2 and corresponding thrusting propellers 1012-1, 1012-2. Specifically, in the illustrated example, there is a front thrusting motor 1010-1 coupled to and positioned near an approximate mid-point of the front wing 1020. The front thrusting motor 1010-1 is oriented such that the corresponding thrusting propeller 1012-1 is positioned inside the perimeter frame 1000. The second thrusting motor is coupled to and positioned near an approximate mid-point of the lower rear wing 1024. The rear thrusting motor 1010-2 is oriented such that the corresponding thrusting propeller 1012-2 is positioned inside the perimeter frame 1000.

While the example illustrated in FIG. 10 illustrates the autonomous aerial vehicle with two thrusting motors 1010 and corresponding thrusting propellers 1012, in other implementations, there may be fewer or additional thrusting motors and corresponding thrusting propellers. For example, in some implementations, the autonomous aerial vehicle 1004 may only include a single rear thrusting motor 1010 and corresponding thrusting propeller 1012. In another implementation, there may be two thrusting motors and corresponding thrusting propellers mounted to the lower rear wing 1024. In such a configuration, the front thrusting motor 1010-1 may be included or omitted from the autonomous aerial vehicle 1004. Likewise, while the example illustrated in FIG. 10 shows the thrusting motors oriented to position the thrusting propellers inside the perimeter frame 1000, in other implementations, one or more of the thrusting motors 1010 may be oriented such that the corresponding thrusting propeller 1012 is oriented outside of the protective frame 1000.

The perimeter frame 1000 provides safety for objects foreign to the autonomous aerial vehicle 1004 by inhibiting access to the lifting propellers 1002 from the side of the autonomous aerial vehicle 1004, provides protection to the autonomous aerial vehicle 1004, and increases the structural integrity of the autonomous aerial vehicle 1004. For example, if the autonomous aerial vehicle 1004 is traveling horizontally and collides with a foreign object (e.g., wall, building), the impact between the autonomous aerial vehicle 1004 and the foreign object will be with the perimeter frame 1000, rather than a propeller. Likewise, because the frame is interconnected with the central frame 1017, the forces from the impact are dissipated across both the perimeter frame 1000 and the central frame 1017.

The perimeter frame 1000 also provides a surface upon which one or more components of the autonomous aerial vehicle 1004 may be mounted. Alternatively, or in addition thereto, one or more components of the autonomous aerial vehicle may be mounted or positioned within the cavity of the portions of the perimeter frame 1000. For example, one or more antennas may be mounted on or in the front wing 1020. The antennas may be used to transmit and/or receive wireless communications. For example, the antennas may be utilized for Wi-Fi, satellite, near field communication ("NFC"), cellular communication, or any other form of wireless communication. Other components or sensors, such as imaging elements (e.g., cameras), time of flight sensors, accelerometers, inclinometers, distance-determining elements, barometers, magnetic sensors, gimbals, Global Positioning System (GPS) receiver/transmitter, radars, illumination elements, speakers, and/or any other component of the autonomous aerial vehicle 1004 or the aerial vehicle control system (discussed below), etc., may likewise be mounted to or in the perimeter frame 1000. Likewise, identification or reflective identifiers, such as identifiers 1070, 1071, 1072 may be mounted to the perimeter frame 1000 to aid in the identification of the autonomous aerial vehicle 1004.

In some implementations, multiple imaging elements 1050, such as digital still cameras, red, green, blue (RGB) cameras, video cameras, thermographic cameras, etc., may be mounted to and spaced about the frame of the autonomous aerial vehicle 1004. Likewise, one or more distance determining elements 1051 may be coupled to the frame of the aerial vehicle. Any type of distance determining element may be utilized, including, but not limited to, a time-of-flight sensor, range finder, Sound Navigation and Ranging ("SONAR"), Light Detection and Ranging ("LIDAR"), etc.

As illustrated, the imaging elements 1050 may be affixed to any portion of the frame of the autonomous aerial vehicle 1004. For example, imaging elements 1050 may be arranged along the front of the front wing 1020. As another example, imaging elements 1050 may be arranged along the underneath or lower side of the side rail 1030-1. As will be appreciated, any number of imaging elements may be included on any portion of the frame 1000 and oriented in any position. In some implementations, imaging elements 1050 may be positioned such that approximately all areas around the aerial vehicle are within a field of view of at least one imaging element 1050.

In some implementations, the perimeter frame 1000 may also include a permeable material (e.g., mesh, screen) that extends over the top and/or lower surface of the perimeter frame 1000 enclosing the central frame, lifting motors, and/or lifting propellers.

An aerial vehicle control system 1014 is also mounted to the central frame 1017. In this example, the aerial vehicle control system 1014 is mounted to the hub 1008 and is enclosed in a protective barrier. The protective barrier may provide the control system 1014 weather protection so that the autonomous aerial vehicle 1004 may operate in rain and/or snow without disrupting the control system 1014. In some implementations, the protective barrier may have an aerodynamic shape to reduce drag when the autonomous aerial vehicle is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the autonomous aerial vehicle 1004 includes one or more power modules 1053. In some implementations, the power modules 1053 may be positioned inside a cavity of the side rails 1030-1, 1030-2. In other implementations, the power modules 1053 may be mounted or positioned at other locations of the autonomous aerial vehicle. The power modules 1053 for the autonomous aerial vehicle may be in the form of battery power, solar power, gas power, super capacitor, fuel cell, alternative power generation source, or a combination thereof. The power module(s) are coupled to and provide power for the aerial vehicle control system 1014, the lifting motors 1006, the thrusting motors 1010, the imaging elements 1050, the payload engagement mechanism 1054, and/or other components and/or sensors of the aerial vehicle.

In some implementations, one or more of the power modules 1053 may be configured such that it can be autonomously removed and/or replaced with another power module while the autonomous aerial vehicle is landed or in flight. For example, when the autonomous aerial vehicle lands at a location, the autonomous aerial vehicle may engage with a charging member at the location that will recharge the power module.

As mentioned above, the autonomous aerial vehicle 1004 may also include a payload engagement mechanism 1054 and/or 1007. The payload engagement mechanism 1054, 1007 may be configured to engage and disengage items and/or containers that hold items (payload). In this example, the payload engagement mechanism 1054 is positioned beneath and coupled to the hub 1008 of the frame 1000 of the autonomous aerial vehicle 1004. The payload engagement mechanism 1054 may be of any size sufficient to securely engage and disengage a payload. In other implementations, the payload engagement mechanism 1054 may operate as the container in which it contains item(s). The payload engagement mechanism 1054 communicates with (via wired or wireless communication) and is controlled by the aerial vehicle control system 1014. Payload engagement mechanism 1007 may be configured to engage with cables or engagement receptors on a payload that is to be engaged by the autonomous aerial vehicle 1004.

Figure 11:
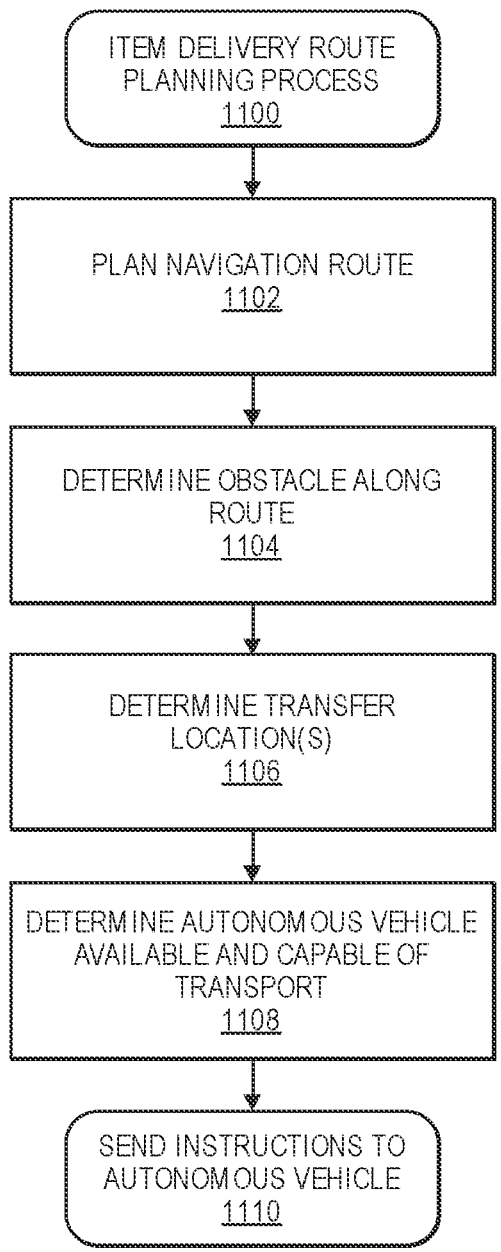
FIG. 11 is a flow diagram of an example item delivery route planning process, in accordance with implementations of the present disclosure.

FIG. 11 is a flow diagram of an example item delivery route planning process 1100, in accordance with the implementations of the present disclosure. The example process 1100 begins by planning a navigation route between a source location and a destination location, as in 1102. For example, if an item is ordered by a customer from an electronic commerce website, the item may be stored in a fulfillment center (source location) and the destination location may be specified by the customer as part of the purchase of the item. For example, the customer may select to have the item delivered to any source location including, but not limited to, a residence, business location, geographic coordinate, etc. In some examples, a customer may specify that the item is to be delivered to the current location of the customer. In such an example, the destination location corresponds to the location of the customer, which may be determined based on, for example, position information provided by a client device in the possession of the customer. For example, a client device, such as a smartphone, tablet, etc., in the possession of the user may periodically provide position information (e.g., GPS information) to the example process 1100 indicating the position of the customer.

Upon determining the navigation route, one or more obstacles along the navigation route are determined, as in 1104. For example, images or information relating to routes may be obtained and processed to determine obstacles along the route. For example, as autonomous vehicles navigate a route or aerially navigate over routes, the autonomous vehicles obtain information about the routes. For example, sensors of the autonomous vehicles may collect information along the routes and the information may be processed to determine obstacles along the route.

Based on the determined obstacles, one or more transfer locations along the route are determined, as in 1106. As discussed above, the transfer location may be a location at which an item transported by a first autonomous vehicle is transferred to a second autonomous vehicle that will transport the item past the obstacles. In other examples, the transfer location may be a location in which a second autonomous vehicle engages the first autonomous vehicle and transports both the first autonomous vehicle and the item past the obstacle.

Upon determining a transfer location, an autonomous vehicle that is available and capable of transporting the item and/or the autonomous vehicle transporting the item from the transfer location past the autonomous vehicle is determined, as in 1108. As discussed above, an autonomous vehicle is considered available if the autonomous vehicle is within a defined distance of the transfer location such that it can navigate to the transfer location and arrive at the transfer location at a defined time, and the autonomous vehicle will not be performing another task or operation. An autonomous vehicle is considered capable if the autonomous vehicle has payload capability to transport the item and/or the autonomous vehicle, has sufficient power to transport the item and/or the autonomous vehicle, and has the ability to transport the item and/or the autonomous vehicle from the transfer location and past the obstacle.

Finally, instructions are sent to the autonomous vehicle for instructing the autonomous vehicle to navigate to the transfer location and transport the item past the obstacle, as in 1110. For example, if the autonomous vehicle is an autonomous aerial vehicle, the instructions may instruct the autonomous vehicle to aerially navigate from a current location to the transfer location.

Figure 12:
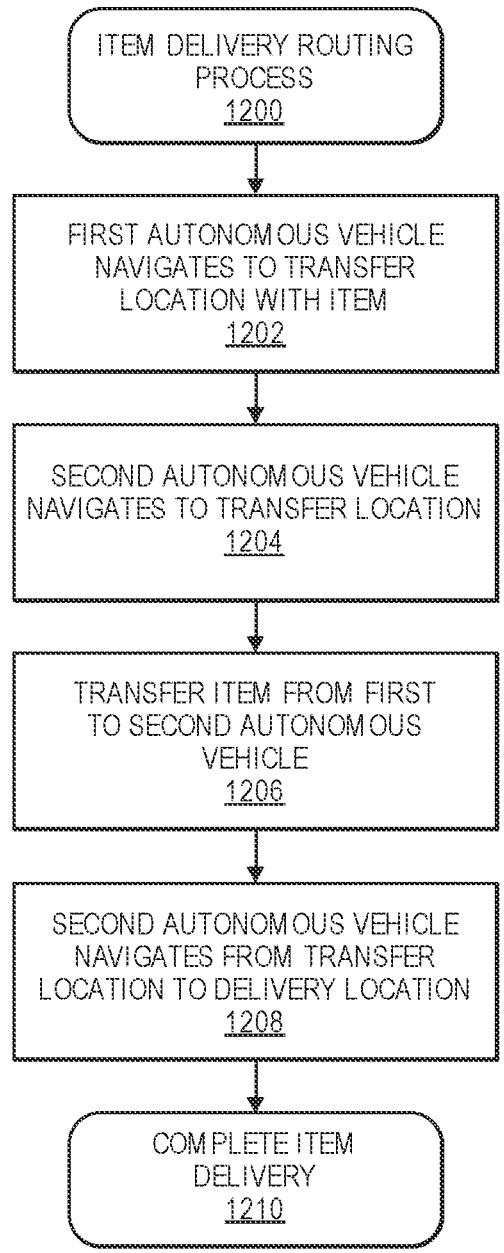
FIG. 12 is a flow diagram of an example item delivery routing process, in accordance with implementations of the present disclosure.

FIG. 12 is a flow diagram of an example item delivery routing process 1200, in accordance with the implementations of the present disclosure. The example process 1200 begins with a first autonomous vehicle transporting an item from a source location to a transfer location, as in 1202. As discussed above, the first autonomous vehicle may be any type of autonomous vehicle, including but not limited to, an autonomous aerial vehicle or an autonomous ground based vehicle. Likewise, the transfer location may be any location along the navigation path determined for transport of the item between a source location and a destination location. In some examples, the transfer location may be adjacent an obstacle that cannot be passed by the first autonomous vehicle. In other examples, the transfer location may be adjacent the destination location.

In addition to the first autonomous vehicle transporting the item from the source location to a transfer location, a second autonomous vehicle also navigates to the transfer location, as in 1204. As discussed above, the second autonomous vehicle may be any type of autonomous vehicle that is determined to be available and capable for transporting the item from the transfer location and past an obstacle and/or to the destination location. In some implementations, the second autonomous vehicle may also be capable of transporting both the first autonomous vehicle and the item past the obstacle.

When both the first autonomous vehicle and the second autonomous vehicle are at the transfer location, the item is transferred from the first autonomous vehicle to the second autonomous vehicle, as in 1206. For example, an inventory engagement mechanism of the second autonomous vehicle may engage the item while the item is positioned on the first autonomous vehicle and transfer the item from the first autonomous vehicle.

Upon transfer of the item from the first autonomous vehicle to the second autonomous vehicle, the second autonomous vehicle navigates with the item from the transfer location and, in this example, to the destination location, as in 1208. In other implementations, the second autonomous vehicle may navigate the item from the transfer location, past an obstacle, and to another transfer location at which the item is transferred to another autonomous vehicle prior to delivery of the item to the destination location. Finally, when the item is transported to the destination location, the delivery of the item is completed by release of the item by the autonomous vehicle to the destination location, as in 1210.

The systems and methods of the present disclosure are directed to utilizing autonomous vehicles to deliver items, etc. The information or data that may be captured and reported by one or more autonomous vehicles, or obtained from any intrinsic, extrinsic sources and/or emergency personnel, and utilized to generate or modify navigation paths in accordance with the present disclosure is not limited. For example, such information or data may be qualitative in nature, e.g., paths, speeds, lighting levels, positions, times or dates, battery life, fuel levels or carrying capacities expressed in numeric terms. The information or data may also be qualitative in nature, e.g., courses, speeds, positions, times or dates of arrival or departure, battery life, fuel levels or carrying capacities expressed in words such as "northeast," "south," "slow," "fast," "high," "valley," "waypoint," "tilt," "Sunday," "low light," "poor lighting," "good lighting," "safe," "dangerous," "full charge," "half tank," etc.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 11-12, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:
    transporting, via an autonomous ground based vehicle, an item to a transfer location, the transfer location comprising a movable platform configured to receive the autonomous ground based vehicle;
    determining the transfer location based on an obstacle between a source location and a destination location, wherein the obstacle comprises at least one of a step, a curb, or a fence;
    transporting, via a plurality of autonomous aerial vehicles, the movable platform that has received the autonomous ground based vehicle and the item from the transfer location to the destination location; and
    completing a delivery of the item by the autonomous ground based vehicle at the destination location.

2. The method of claim 1, wherein the transfer location is further determined based at least in part on one or more of the destination location, weather, the source location, or a navigation path of the autonomous ground based vehicle.

3. The method of claim 1, wherein the destination location is at least one of a rooftop of a building, a balcony, a porch, or a personal residence.

4. A system, comprising:
- a first autonomous vehicle configured to transport an item along a first portion of a navigation path between a source location and a destination location;
- a transfer location along the navigation path between the source location and the destination location, the transfer location comprising a movable platform configured to receive the first autonomous vehicle;
- a plurality of second autonomous vehicles configured to transport the movable platform that has received the first autonomous vehicle and the item along a second portion of the navigation path between the source location and the destination location; and
- a management system including one or more processors, and a memory including program instructions that when executed by the one or more processors cause the one or more processors to at least:
  - instruct operations of the first autonomous vehicle and the plurality of second autonomous vehicles;
  - determine an obstacle between the source location and the destination location, the obstacle comprising at least one of a step, a curb, or a fence; and
  - determine the transfer location based at least in part on the obstacle or a location of the obstacle.

5. The system of claim 4, wherein the first portion of the navigation path extends between the source location and the transfer location;
- wherein the second portion of the navigation path extends between the transfer location and the destination location; and
- wherein the plurality of second autonomous vehicles couples to the movable platform that has received the first autonomous vehicle at the transfer location.

6. The system of claim 4, wherein the second portion of the navigation path extends between the source location and the transfer location;
- wherein the first portion of the navigation path extends between the transfer location and the destination location; and
- wherein the plurality of second autonomous vehicles decouples from the movable platform that has received the first autonomous vehicle at the transfer location.

7. The system of claim 4, wherein the obstacle comprises a plurality of obstacles, the plurality of obstacles further comprising a second obstacle including at least one of a weather, a traffic, a body of water, a congestion, or a vertical height.

8. The system of claim 4, wherein the management system further comprises:
- a first management system configured to instruct operations of the first autonomous vehicle, and
- a second management system configured to instruct operations of the plurality of second autonomous vehicles.

9. The system of claim 8, wherein the first management system is further configured to plan the first portion of the navigation path for the first autonomous vehicle;
- wherein the second management system is further configured to plan the second portion of the navigation path for the plurality of second autonomous vehicles; and
- wherein the first and second management systems are further configured to communicate and coordinate transport of the item using the first and second autonomous vehicles.

10. The system of claim 4, wherein the first autonomous vehicle comprises an autonomous ground based vehicle, and the plurality of second autonomous vehicles comprises a plurality of autonomous aerial vehicles.

11. The system of claim 10, wherein the second portion of the navigation path comprises a vertical component of the navigation path.

12. A method, comprising:
- transporting, via a first autonomous vehicle, an item along a first portion of a navigation path between a source location and a destination location;
- determining an obstacle between the source location and the destination location, the obstacle comprising at least one of a step, a curb, or a fence;
- determining a transfer location based at least in part on the obstacle or a location of the obstacle;
- receiving the first autonomous vehicle on a movable platform at the transfer location between the source location and the destination location;
- transporting, via a plurality of second autonomous vehicles, the movable platform that has received the first autonomous vehicle and the item along a second portion of the navigation path between the source location and the destination location; and
- completing a delivery of the item by at least one of the first autonomous vehicle or the plurality of second autonomous vehicles at the destination location.

13. The method of claim 12, further comprising:
- at least one of coupling or decoupling, by the plurality of second autonomous vehicles, with respect to the movable platform that has received the first autonomous vehicle and the item at the transfer location between the source location and the destination location.

14. The method of claim 12, wherein transporting, via the plurality of second autonomous vehicles, the movable platform that has received the first autonomous vehicle and the item further comprises:
- carrying, by the plurality of second autonomous vehicles, the movable platform that has received the first autonomous vehicle and the item along the second portion of the navigation path.

15. The method of claim 12, wherein the first autonomous vehicle comprises an autonomous ground based vehicle;
- wherein the plurality of second autonomous vehicles comprises a plurality of autonomous aerial vehicles; and
- wherein the second portion of the navigation path comprises a vertical component.

* * * * *